United States Patent [19]

Waller

[11] Patent Number: 4,532,605
[45] Date of Patent: Jul. 30, 1985

[54] TRUE ZOOM OF A DISPLAYED IMAGE

[75] Inventor: William G. Waller, Portland, Oreg.

[73] Assignee: Tektronix, Inc., Beaverton, Oreg.

[21] Appl. No.: 367,829

[22] Filed: Apr. 12, 1982

[51] Int. Cl.³ .............................. G06F 3/14; G09G 1/16
[52] U.S. Cl. .................................... 364/900; 364/300; 340/731
[58] Field of Search ... 364/200 MS File, 900 MS File, 364/300 MS, 521, 522, 514, 515; 340/723, 731, 728, 747, 799, 721, 324 AD, 724, 726, 734, 750, 792; 358/183, 22

[56] References Cited

U.S. PATENT DOCUMENTS

| Re. 31,200 | 4/1983 | Sukonick et al. | 364/900 |
|---|---|---|---|
| 3,976,982 | 8/1976 | Eiselen | 364/900 |
| 4,107,662 | 8/1978 | Endo et al. | 340/731 |
| 4,124,871 | 11/1978 | Morrin | 340/731 |
| 4,197,590 | 4/1980 | Sukonick et al. | 364/900 |
| 4,311,998 | 1/1982 | Matherat | 340/731 |
| 4,321,597 | 3/1982 | Martin | 340/731 |
| 4,356,482 | 10/1982 | Oguchi | 340/744 |
| 4,366,475 | 12/1982 | Kishi et al. | 340/731 |

FOREIGN PATENT DOCUMENTS 0161840 12/1979 Japan .................................. 340/731

Primary Examiner—James D. Thomas
Assistant Examiner—William G. Niessen
Attorney, Agent, or Firm—John H. Bouchard; Robert S. Hulse; Allston L. Jones

[57] ABSTRACT

The present invention relates to a capability present within a graphics display terminal wherein a zoom operation may be accomplished, the width of each of the lines of the zoomed image being maintained at a one pixel width regardless of the degree or amount of magnification of the zoomed image. This is accomplished by utilizing the firmware stored in the processor to perform the magnification of the image therein, prior to the storage of the appropriate binary data in the video display memory, the binary data being the pixel representation of the displayed image. Since the magnification of the image takes place prior to storage of the binary data in the video display memory, the graphics display terminal of the present invention can use this binary data to display an image, a zoomed image, the width of each line being equal to, approximately, a one pixel width. Therefore, despite the degree of magnification of the zoomed image, a very discernable, clear image will be displayed on the CRT.

4 Claims, 14 Drawing Figures

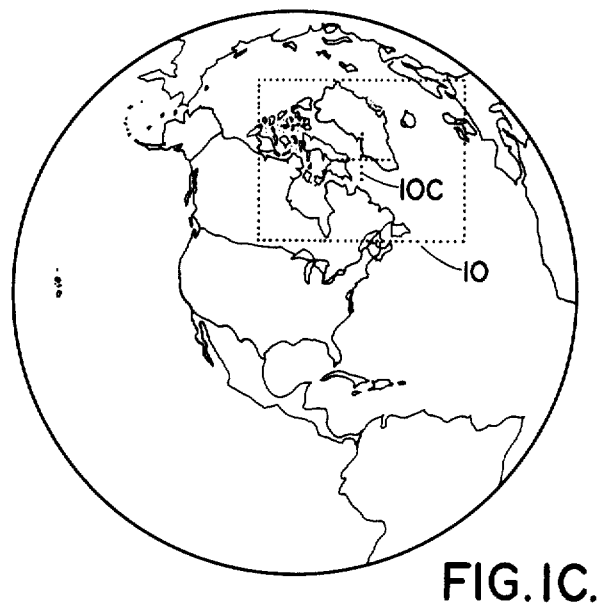
FIG.IC.
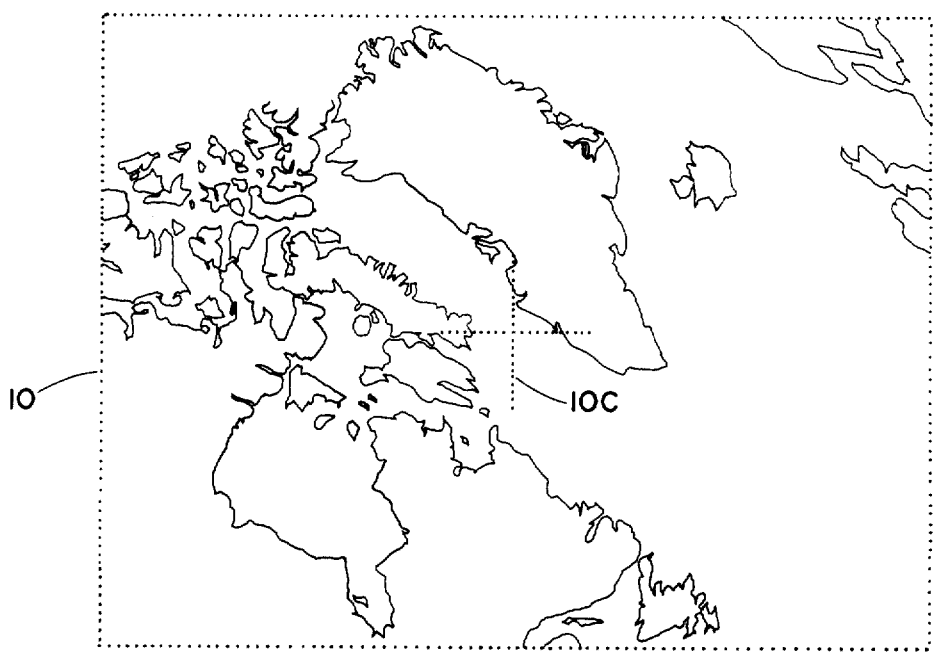
FIG.ID.

TRUE ZOOM OF A DISPLAYED IMAGE

BACKGROUND OF THE INVENTION

1. Field of the Invention

The present invention relates to a graphics display terminal's capability to zoom in on a displayed image.

2. Description of the Prior Art

Graphics display terminals of the prior art possessed a zoom capability whereby a portion of a displayed image could be magnified on a cathode ray tube (CRT) for further display. However, the terminal performed the zoom operation based on the already established pixel representation of the image. The pixel representation of the image would be stored in a memory. The zoom operation was entirely hardware generated. When performing the zoom operation, the hardware would read the pixel data from the memory at rate slower than the rate at which the pixel data was read from the memory when the hardware was not performing the zoom operation. Since the raster scan across the CRT always takes place at the same scan rate, the visual effect of reading the data from the memory at the slower rate, when performing the zoom operation, was an increase in the width of the lines displayed on the CRT. Consequently, if it were desired to perform the zoom operation on a certain small portion of the displayed image, the width of each and every line would increase as a result of the zoom operation. Since the line width increases as a result of the zoom operation, there is a definite limit in the amount or degree to which a displayed image can undergo a zoom operation.

Summary of the Invention

It is a primary object of the present invention to provide a graphics display terminal having the capability of performing a zoom operation on a displayed image and maintaining a fixed width of each line of the zoomed image regardless of the degree of magnification of the zoomed image.

It is another object of the present invention to provide more than one view of the zoomed image on the CRT, in addition to the originally displayed image.

These and other objects of the present invention are accomplished by utilizing a processor and its stored firmware to perform the zoom operation prior to building the pixel representation of the displayed image, i.e., prior to storing digital data representing pixel data in a memory. In this way, a one-pixel width for each line of the zoomed image can be maintained regardless of the degree of magnification of the zoomed image.

Further scope of applicability of the present invention will become apparent from the description given hereinafter. However, it should be understood that the details of the description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A full understanding of the present invention will be obtained from the detailed description given hereinbelow and the accompanying drawings which are given by way of illustration only, and thus are not limitative of the present invention, and wherein:

FIGS. 1a–1d are pictoral representations of the results achieved by virtue of the present invention;

DETAILED DESCRIPTION OF THE INVENTION

Figure 1A:
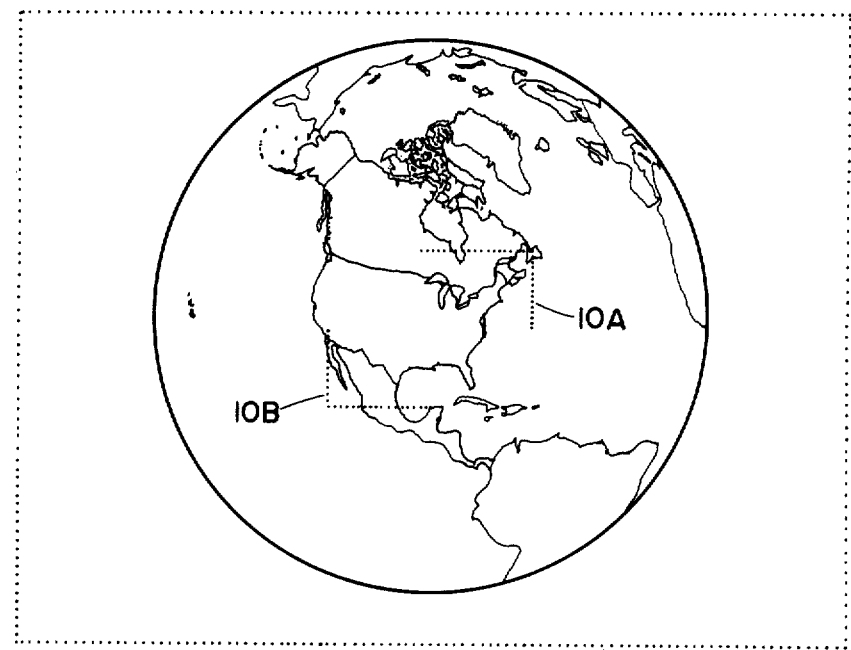
Figure 1B:
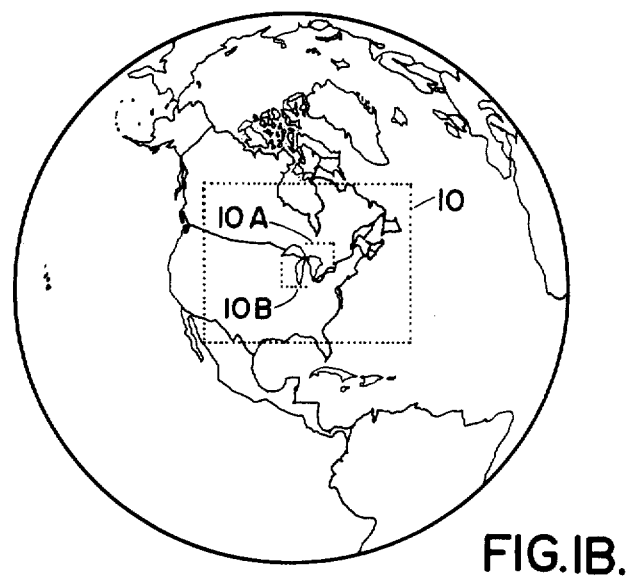

Referring to FIGS. 1a–1d, a pictoral representation of the results achieved by use of the present invention is illustrated. Referring to FIG. 1a, a CRT display is shown, the display being a picture of the globe including the North American continent. By actuating the "zoom" key, the frame box 10 shown in FIG. 1a would result. The frame box 10 includes a smaller centering portion 10a and 10b. The centering portion is a smaller box, included within the frame box 10, for locating the center of the frame box 10 over a particular portion of the displayed image. Attention is particularly directed, in FIG. 1a, to the size of the frame box 10, and its associated centering portion 10a and 10b. If it is desired to reduce the size of the frame box 10, and its associated centering portion 10a, 10b, either along the length dimension or the width dimension thereof, this can be easily accomplished by rotating the thumb wheels of the graphics display terminal of the present invention until the desired size of the frame box 10 is achieved. Attention is directed to FIG. 1b of the drawings of the present application, wherein the frame box 10 of FIG. 1a has been reduced in size. Note that the centering portion 10a and 10b has also been proportionately reduced in size. In FIG. 1b, note that the user has centered the frame box 10 around the state of Michigan in the North American continent.

If the user, at this point, decides that the length and width of the frame box 10 is set at a desired value, the user actuates the "pan" key. Referring to FIG. 1c, actuation of the "pan" key will set the length and width dimensions of the frame box 10, and will position a cross-hair cursor 10c in the center of the frame box 10. After the "pan" key is actuated, and the cross-hair cursor 10c appears in the frame box 10, the operator, by rotating the thumb wheels on the graphics display terminal of the present invention, can actually move the frame box 10 from one location to another on the CRT screen. Note that the frame box 10 in FIG. 1c has been moved to a different location on the CRT, relative to its position as shown in FIG. 1b of the drawings, i.e., the frame box 10 is no longer centered around the state of Michigan in the North American continent.

If, at this point, the user decides that the frame box 10, and its associated cross-hair cursor 10c, is located at the desired portion of the CRT screen, by actuating the "view" key, the operator can further magnify the image encompassed within the frame box 10 shown in FIG. 1c.

Attention is directed to FIG. 1d of the drawings of the present application. This figure represents the image shown in the frame box 10 of FIG. 1c, after undergoing the zoom operation in response to actuation of the "view" key on the keyboard. Note that each of the lines of the zoomed image in FIG. 1d have a width which is equal to the width of the lines shown in FIGS. 1a through 1c of the drawings. Even though the image in the frame box 10 of FIG. 1c has undergone the zoom operation, the width of the lines shown in FIG. 1d is substantially equal to the width of the lines in FIG. 1c of the drawings. In other words, the width of the lines in the zoomed image of FIG. 1d has not increased relative to the width of the lines in the non-zoomed image of FIG. 1c.

Figure 2:
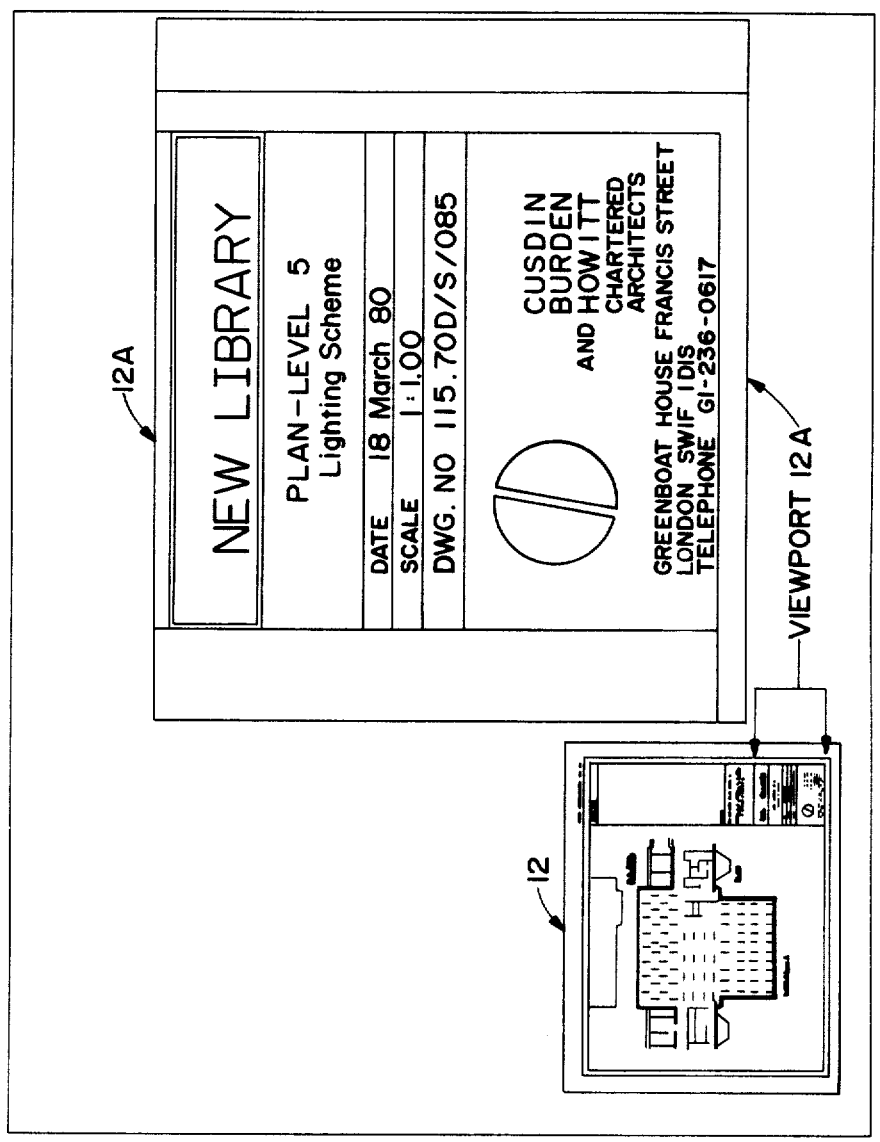
FIG. 2 is another pictoral representation of the results achieved by virtue of the present invention.

Attention is directed to FIG. 2 of the drawings of the present application wherein another capability of the graphics display terminal of the present invention is illustrated. This capability is used in conjunction with the zoom function described hereinabove with respect to FIGS. 1a-1d. In FIG. 2, the viewport 12 illustrates a drawing of a library floor plan. Since the details of the library floor plan shown in viewport 12 of FIG. 2 are not readily visible or discernible, the operator can display a plurality of additional viewports on the display. Using the zoom function in conjunction with an additional viewport, the fine details of the library floor plan shown in viewport 12 will become visible. For example, the additional viewport 12a shown in FIG. 2 represents a zoomed image of the lower right hand portion of the library floor plan shown in viewport 12. The present invention is capable of displaying up to 64 viewports, simultaneously, on the CRT screen of the graphics display terminal of the present invention. For simplicity purposes, only two viewports are shown in FIG. 2.

Figure 3:
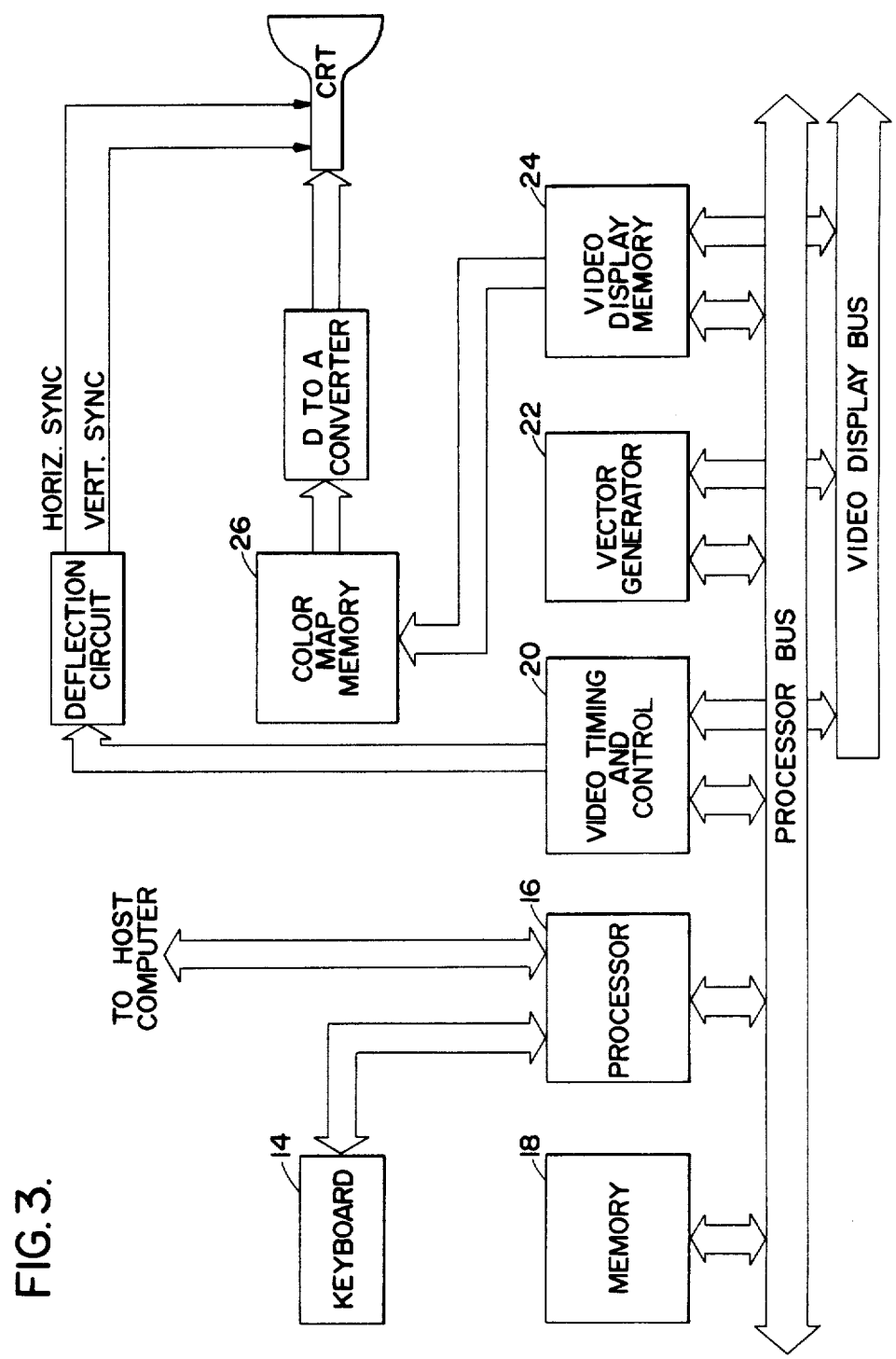
FIG. 3 is a system block diagram of the graphics display terminal of the present invention.

Referring to FIG. 3, a system block diagram of the graphics display terminal of the present invention is illustrated. The keyboard 14 and the host computer are connected to a processor 16, the processor 16 being connected to a processor bus. The processor 16 comprises an Intel 8086 microprocessor, to which is connected a RAM and a ROM. The host computer and the keyboard 14 are connected to the microprocessor. The firmware is stored in the ROM. The output of the microprocessor is connected to the processor bus. A memory 18 is also connected to the processor bus. The host computer, or the keyboard 14 sends original instructions, describing the displayed image, to processor 16, the original instructions being temporarily stored in memory 18. Memory 18 also stores a series of bits therein, hereinafter referred to as a surface information index, associated with another capability of the graphics display terminal of the present invention. This other capability of the graphics display terminal of the present invention, inclusive of the concept behind the surface information index, is discussed in another pending application entitled "Method and Apparatus for Displaying Images", assigned to the same assignee as the present invention, that copending application having been filed in the name of Paula Mossaides on Apr. 12, 1982, and assigned Ser. No. 367,659, the disclosure of which is hereby incorporated by reference.

A video display memory 24 is connected to the processor bus and stores therein the pixel data which is ultimately used for controlling image brightness on the CRT during the raster scan. A vector generator 22 is connected to the processor bus and generates the pixel data in response to instructions from the microprocessor, using the original instructions stored in memory 18, the pixel data being stored in the video display memory 24. The video timing and control circuit 20 is also connected to the processor bus and coordinates the readout of the pixel data stored in the video display memory 24 with the generation of the horizontal and vertical sync signals generated by the deflection circuit and used by the CRT monitor. The display memory 24 is also connected to a color map memory 26, the memory 26 being connected to the CRT via a D to A converter. When the pixel data is read out from the video display memory 24 by the video timing and control circuit 20, the pixel data is used as an index (i.e., an address) to a table stored in the color map memory 26. A corresponding brightness index is located in the table, corresponding to the pixel data located therein, the brightness index being converted to an analog voltage via the D-A converter, the analog voltage determining image brightness for each pixel during the raster scan. The detailed concepts behind the construction of the color map memory, and its associated brightness indices stored herein, are discussed in the co-pending application referred to hereinabove entitled "Method and Apparatus for Displaying Images", filed on Apr. 12, 1982, and assigned Ser. No. 367,659, the disclosure of which has already been incorporated by reference hereinabove.

Figure 4:
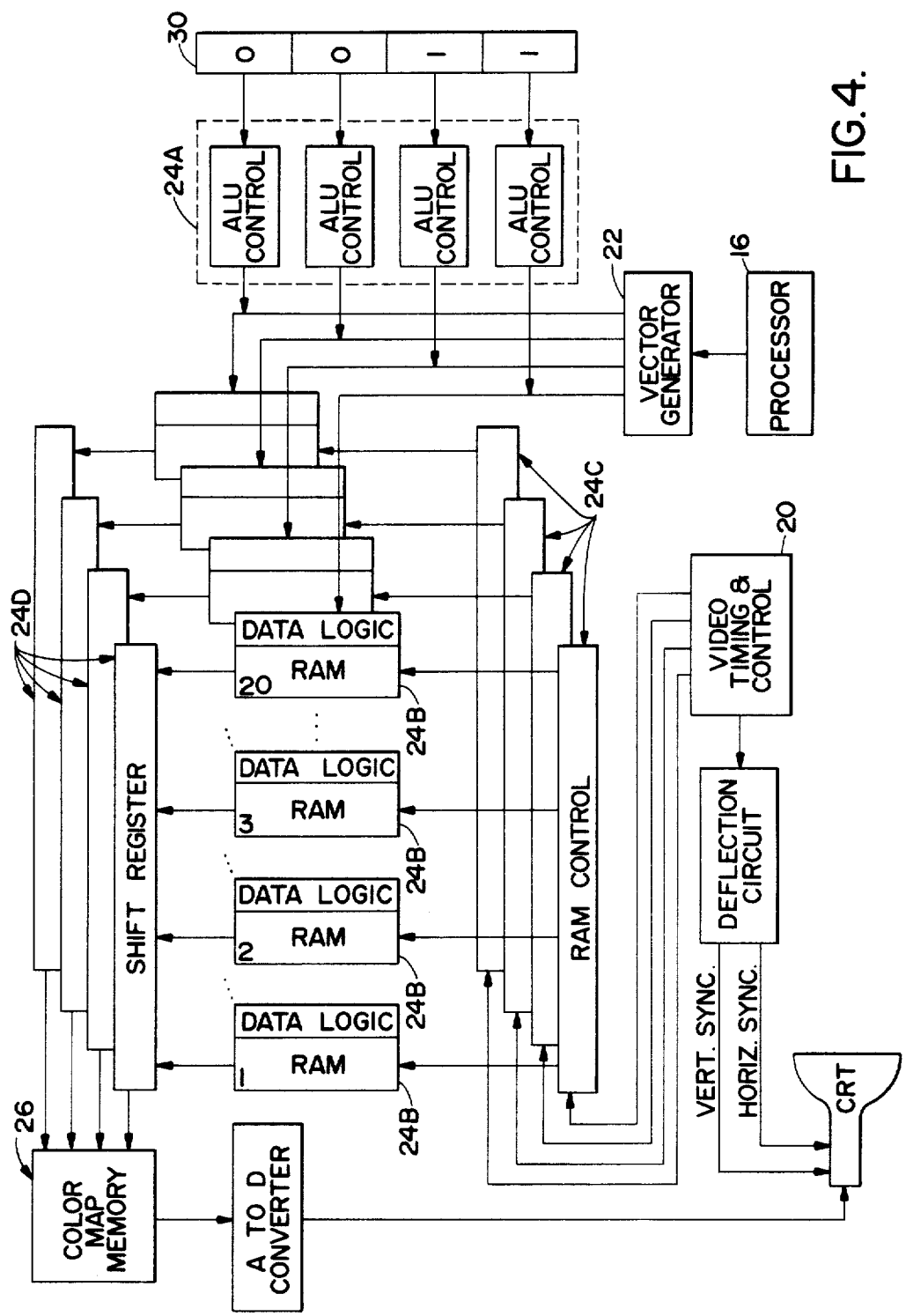
FIG. 4 illustrates the construction of the video display memory shown in FIG. 3.
Figure 5A:
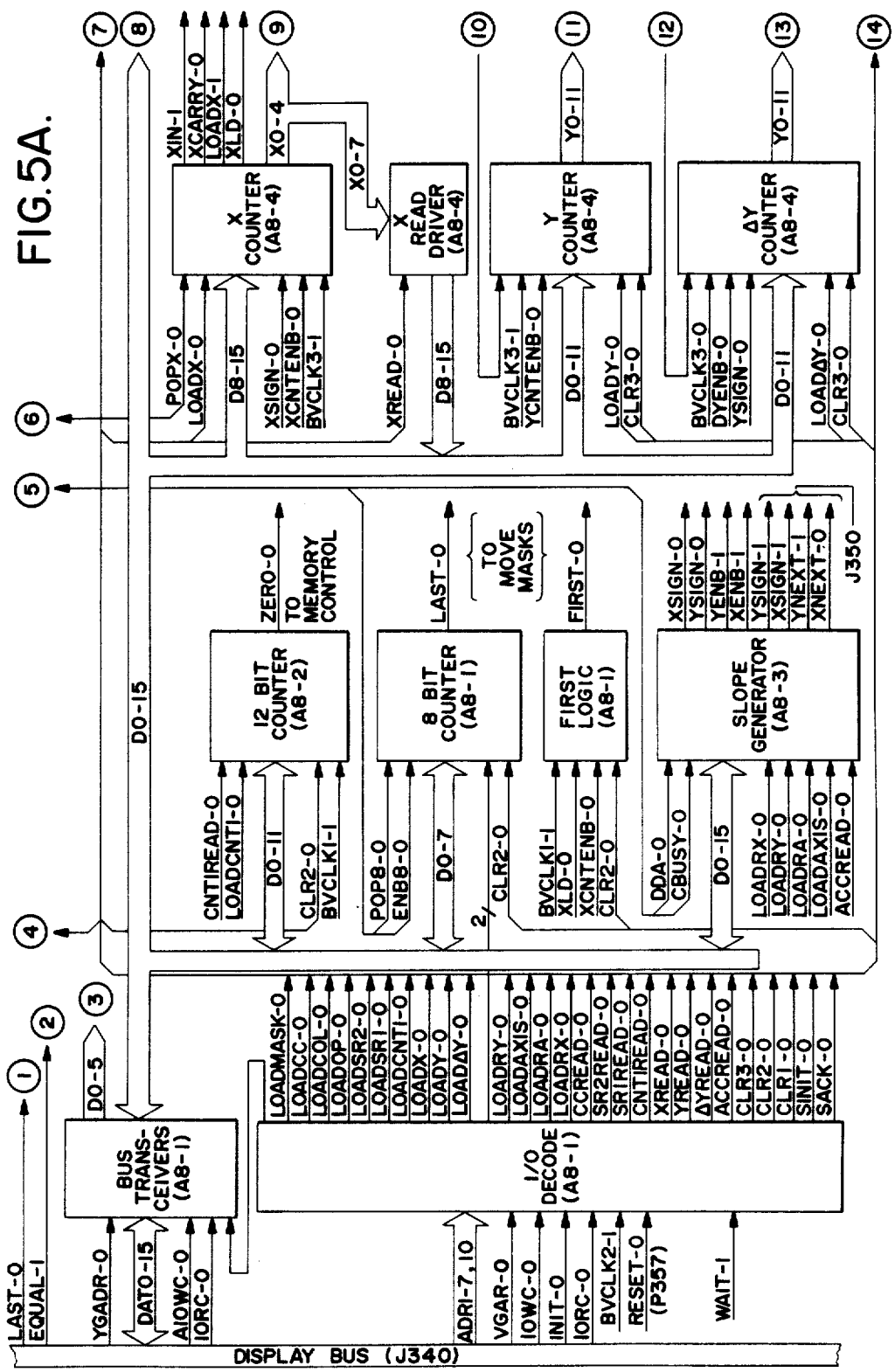
FIG. 5 (consisting of 5A, 5B and 5C) is a system block diagram of the vector generator shown in FIG. 3.
Figure 5B:
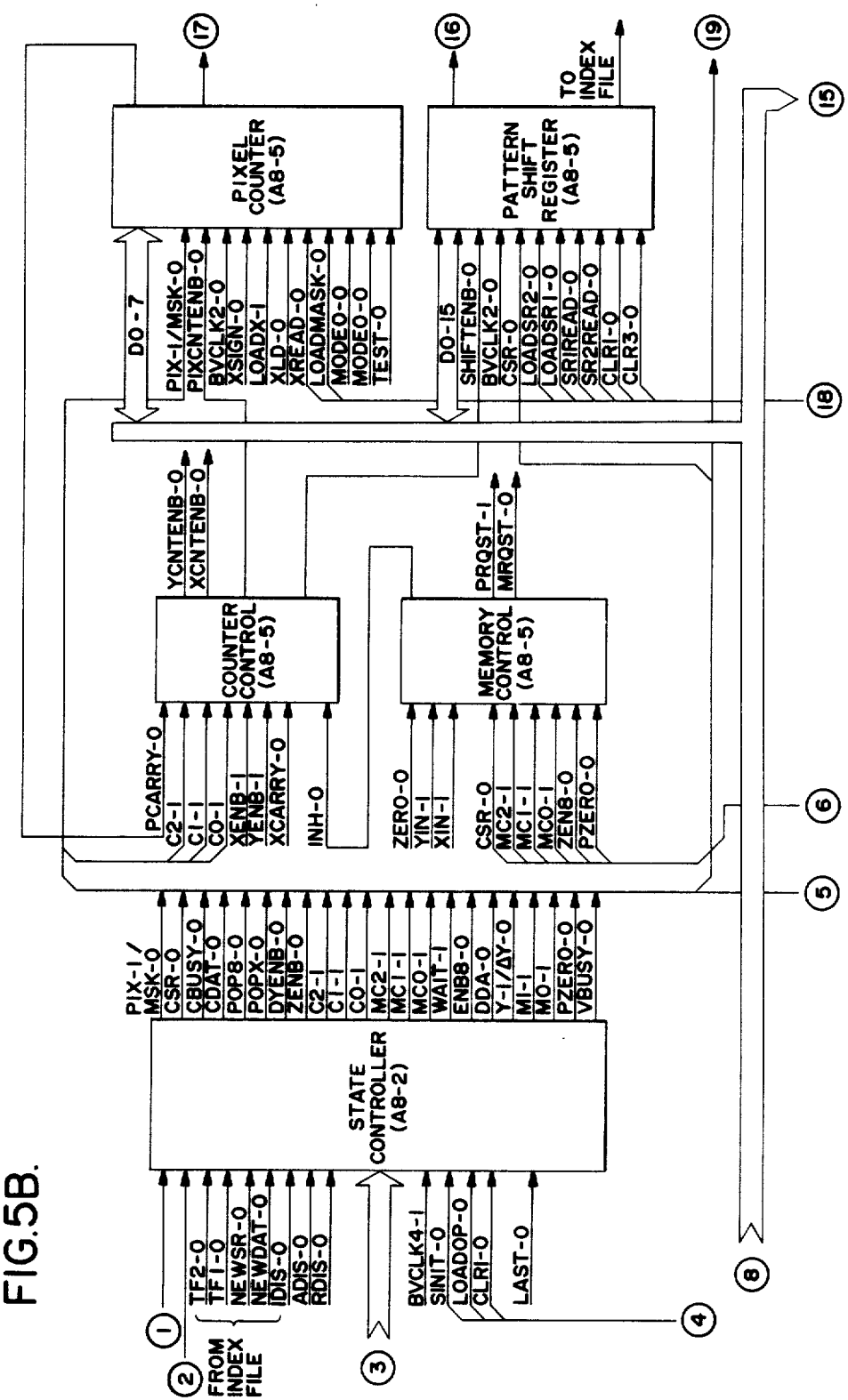
Figure 5C:
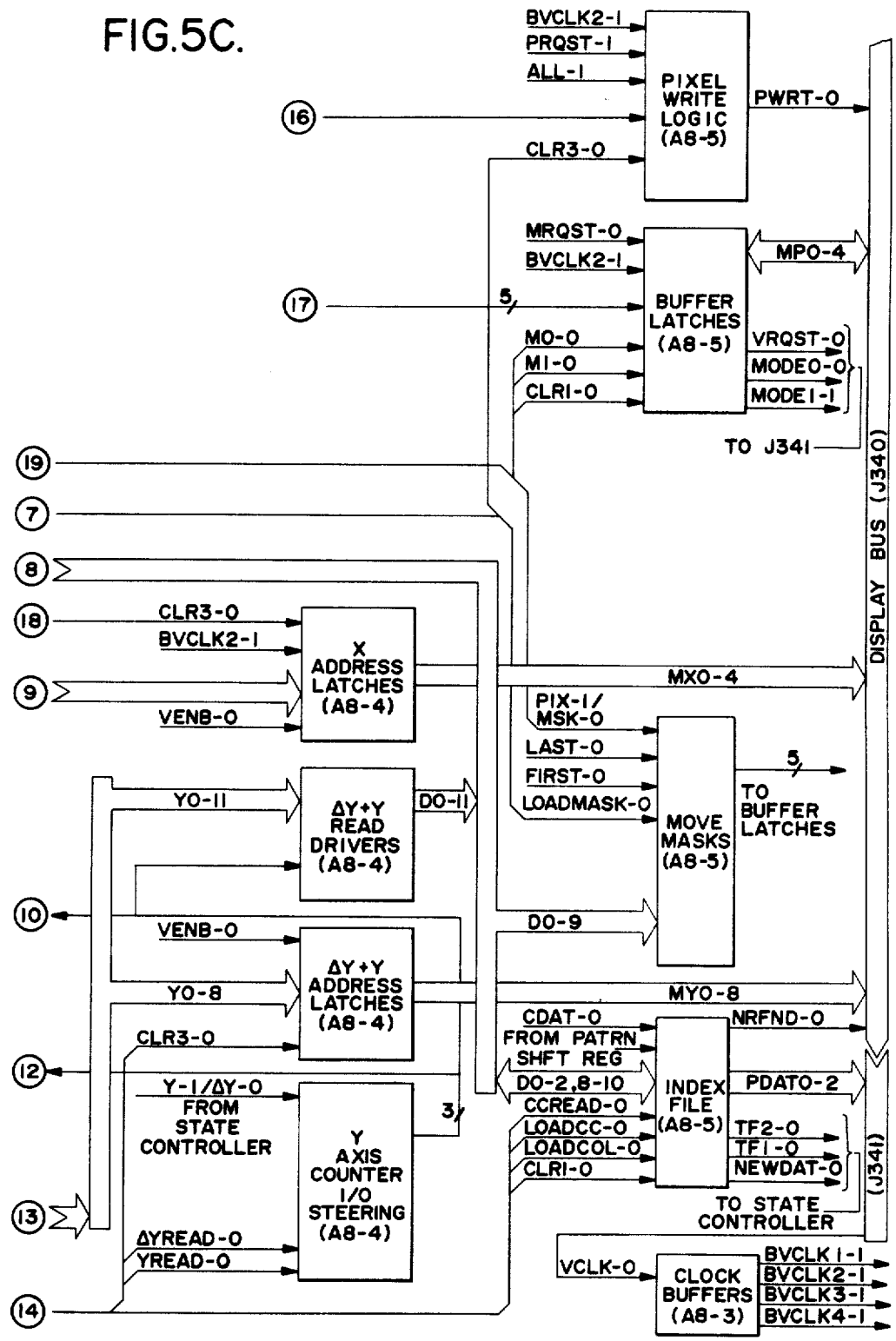
Figure 6:
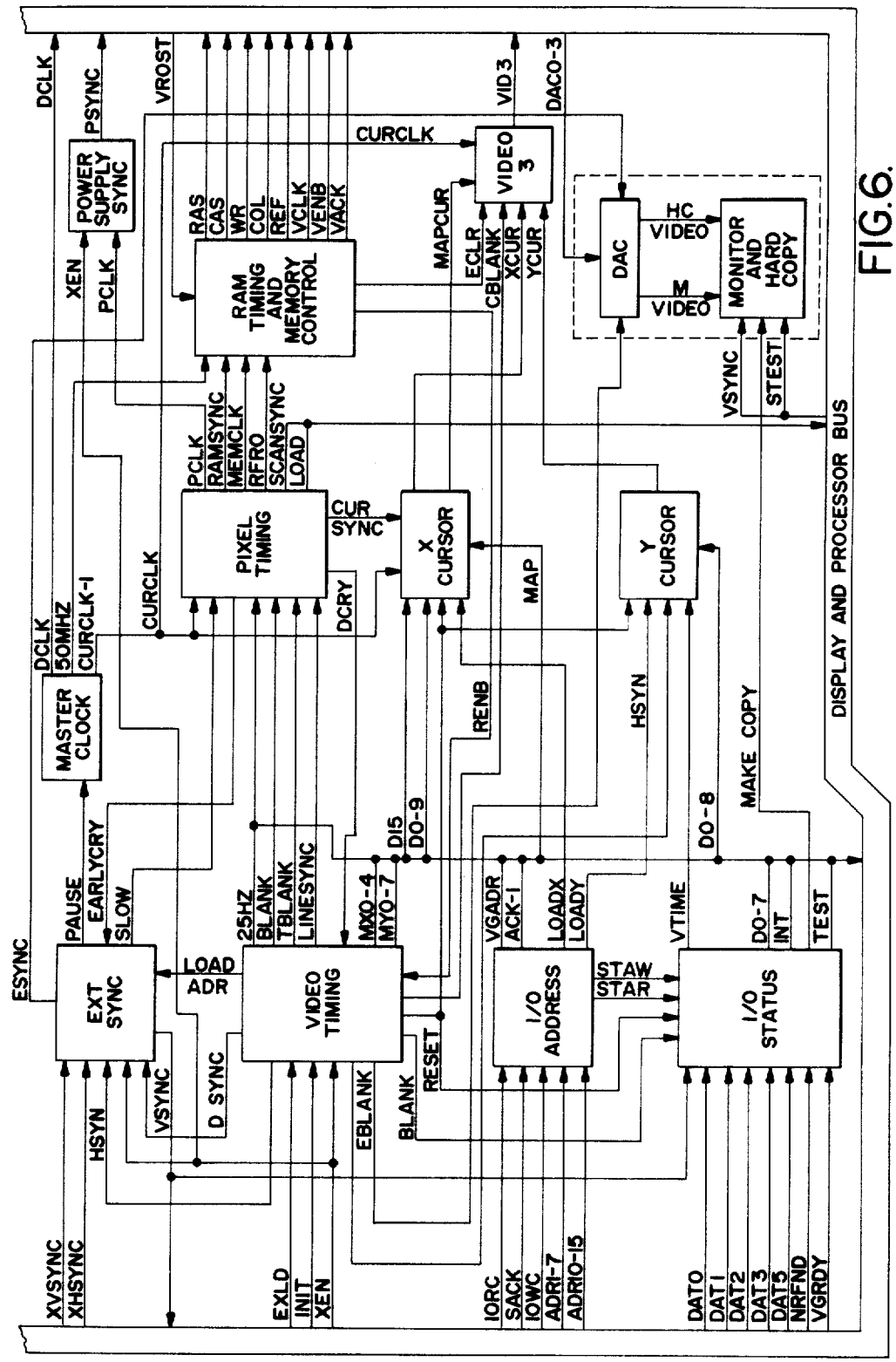
FIG. 6 is a system block diagram of the video timing and control circuit shown in FIG. 3.
Figure 7:
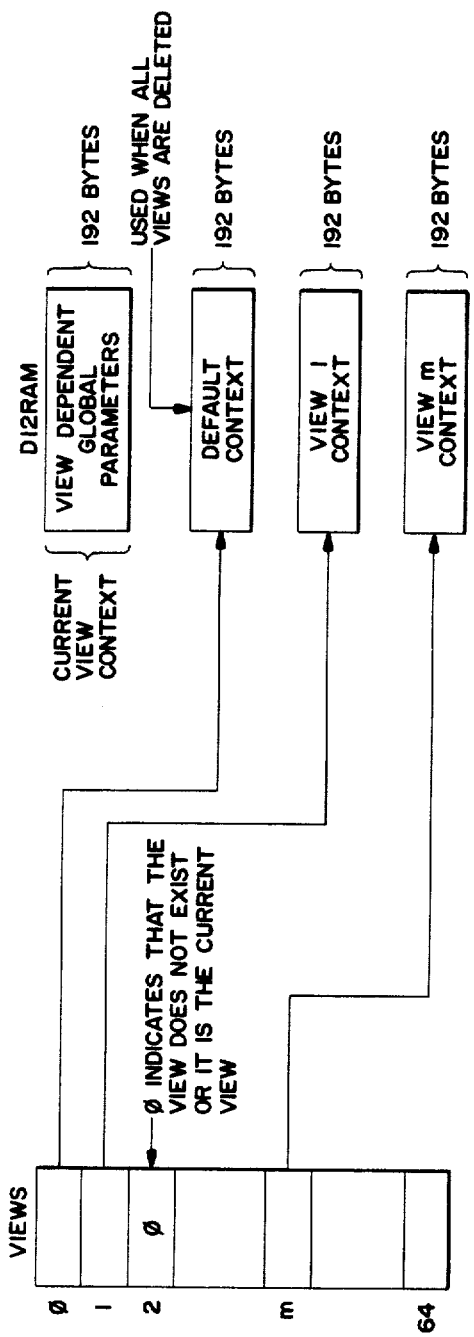
FIG. 7 is a data structure diagram illustrating the set-up of the various views by the firmware of the present invention.
Figure 10:
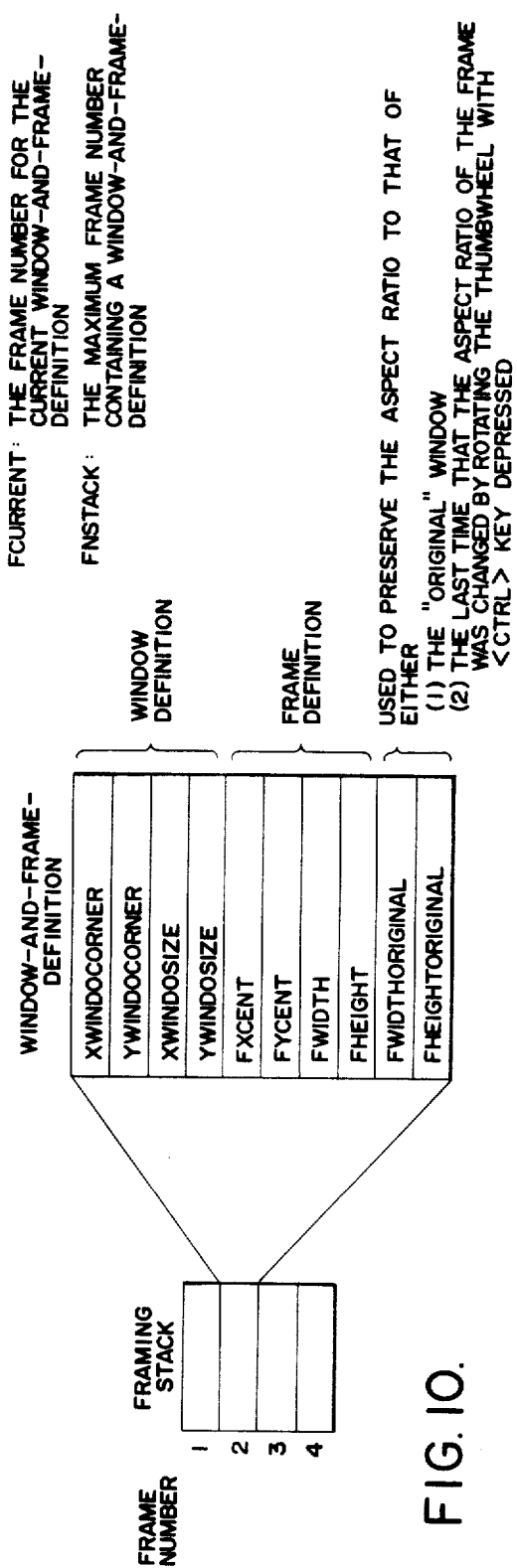
FIG. 10 is a data structure diagram illustrating the frame stack of the firmware of the present invention.
Figure 8:
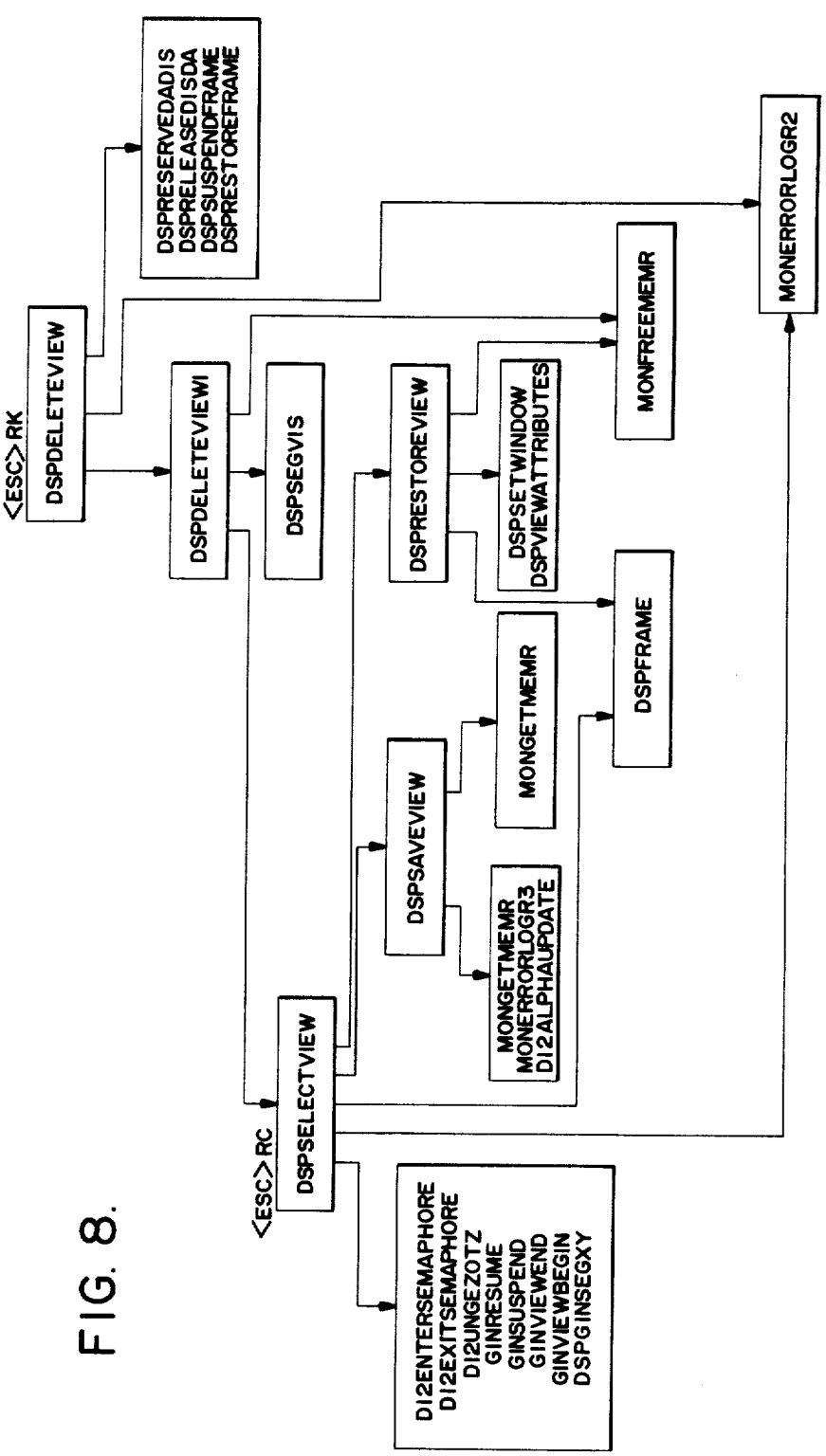
FIG. 8 is a flow diagram showing the interrelationship of the firmware modules of the present invention.
Figure 9:
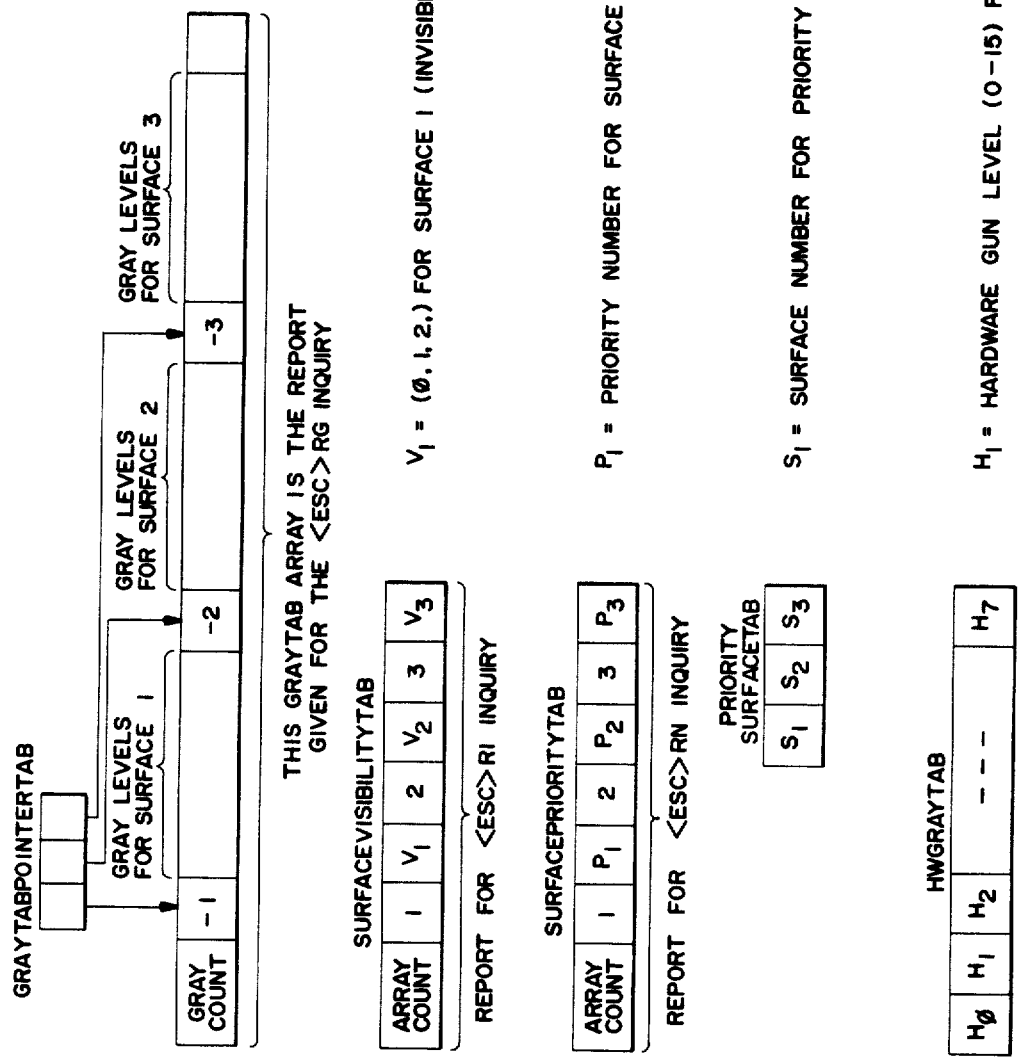
FIG. 9 is a data structure diagram illustrating the storage of color information by the firmware of the present invention.
Figure 11:
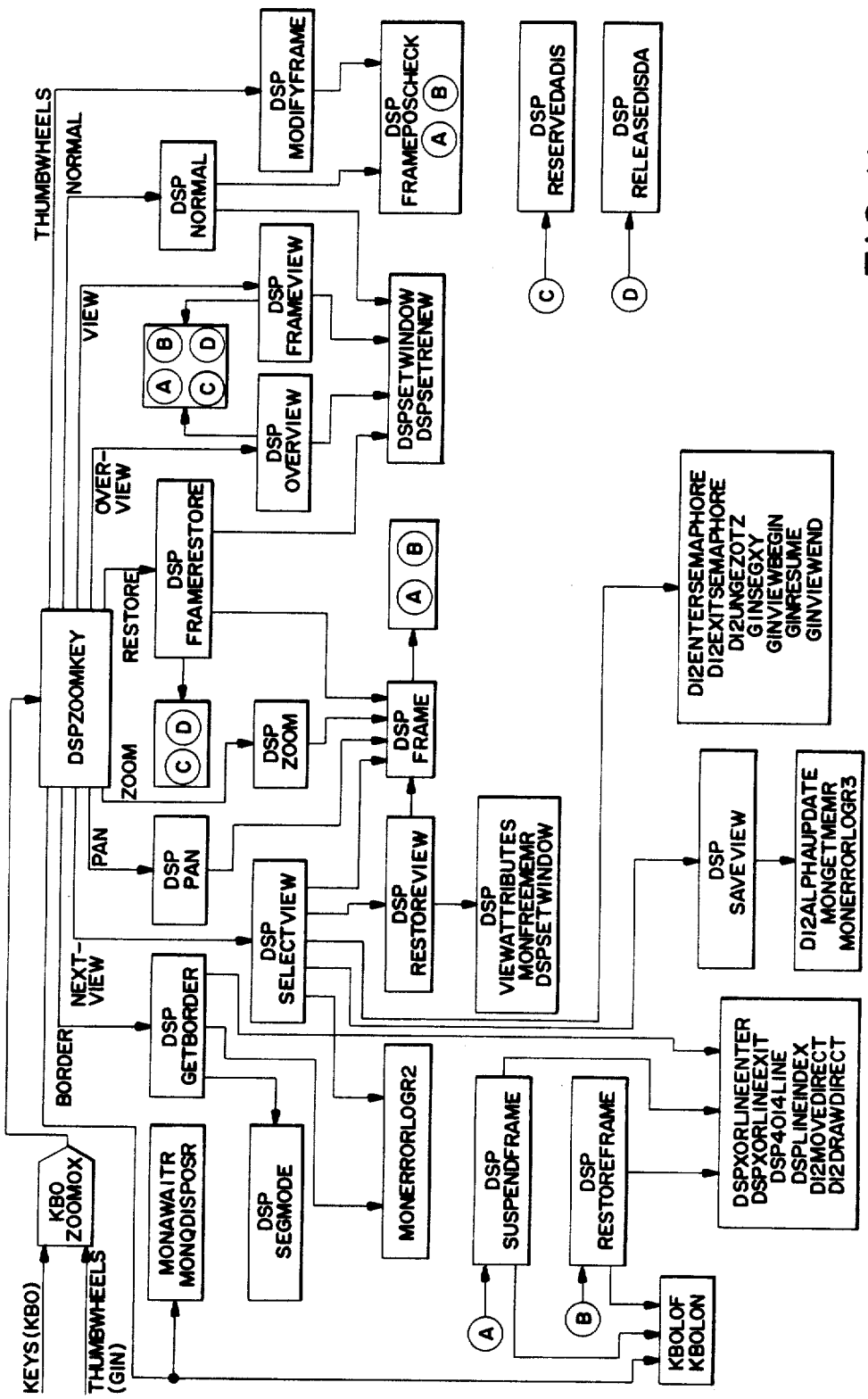
FIG. 11 is a flow diagram of the true zoom algorithm of the firmware of the present invention.

A further detail of the video display memory 24 is shown in FIG. 4 of the drawings of the present application. In FIG. 4, the video display memory 24 of FIG. 3 comprises a plurality of ALU control circuits 24a, each of these ALU control circuits being nothing more than a register capable of being set to a 1 or a 0 in response to the presence or the absence, respectively, of an input signal. If the bit in the ALU register is set to 1, an output signal is developed therefrom. The output terminals of the ALU control circuits 24a are connected to a plurality of bit planes. Each of the bit planes comprise a certain number of RAM/data logic circuits 24b, a RAM control circuit 24c, and a shift register 24d. Each line on the CRT is divided into groups of twenty pixels each. Therefore, in the example shown in FIG. 4, there are twenty (20) RAM/data logic circuits 24b in each bit plane corresponding to the twenty pixels in each group on each line of the CRT. Four bit planes are illustrated in the FIG. 4 circuit embodiment, indicative of a maximum of four bits per pixel. A RAM control circuit 24c is associated with each bit plane and is connected, on one end, to each of the RAM/data logic circuits 24b of its corresponding bit plane. The RAM control circuits 24c are connected, on the other end, to the video timing and control circuit 20 of FIG. 3 and is therefore responsive to the output signals generated therefrom. The outputs of each of the RAM/data logic circuits 24b in each bit plane are connected to a shift register 24d. In response to output signals generated by the video timing and control circuit 20, the RAM control circuits 24c read out the pixel data from the corresponding RAM/data logic circuits 24b for further storage in their corresponding shift registers 24d.

Since there are four bit planes illustrated in the FIG. 4 circuit embodiment, there are four respective RAM control circuits 24c, four sets of RAM/data logic circuits 24b connected to the RAM control circuits 24c, each set, in this embodiment, including 20 RAM/data logic circuits, and four respective shift register circuits 24d connected to the output of the four respective sets of RAM/data logic circuits 24b. The output of each of the shift registers 24d is connected to the color map memory 26 (of FIG. 3). The output of the color map memory 26 is connected to a D-A converter, which is, in turn, connected to the electron guns of the cathode ray tube (CRT). Pixel data is supplied to each of the bit planes from the vector generator 22, of FIG. 3. The vector generator 22 receives its information from the microprocessor in processor 16.

The surface information index 30 shown in FIG. 4 is the combination of bits which are stored in memory 18 of FIG. 3. This combination of bits is created in response to actuation of certain keys on keyboard 14 wherein certain ones of the bit planes shown in FIG. 4 are selected to constitute a "surface". Each "surface" is responsible for generating an image on the cathode ray tube. If two "surfaces" are selected, two images will be displayed on the CRT, each image capable of being displayed independently of one another or superimposed upon one another to create a composite image. The details surrounding the selection of the appropriate "surfaces", and the generation of their images in response thereto, on the CRT, are discussed in the above-mentioned co-pending application entitled "Method and Apparatus for Displaying Images", filed on Apr. 12, 1982 and assigned Ser. No. 367,659, the disclosure of which has already been incorporated by reference hereinabove.

In operation, and referring to FIG. 3, in response to instructions from the host computer, and in accordance with the firmware stored in the ROM of processor 16, the processor issues certain commands therefrom which are directed to the vector generator 22. The vector generator 22, in response thereto, develops certain output signals therefrom representative of digital data to be stored in the video display memory 24. This digital data, stored in the video display memory 24, represents the pixel representation of the displayed image. Once this digital data, the pixel representation of the displayed image, is stored in the video display memory 24, the video timing and control circuit 20 develops certain output signals, which are directed to the RAM control circuit 24c, in FIG. 4, for reading the pixel data from the video display memory 24.

Referring to FIG. 4, the pixel data is stored in the RAM/data logic circuits 24b. As mentioned hereinabove, if the first two bit planes are designated as constituting a "surface", as is the case in FIG. 4, an image is displayed on the CRT associated with the first two bit planes. If the last two bit planes of FIG. 4 are also designated as constituting a surface, two images can be independently displayed on the CRT, or superimposed upon one another to produce a composite image. The details of this operation and display of the multiple images are discussed in the co-pending application mentioned hereinabove entitled "Method and Apparatus for Displaying Images", filed on Apr. 12, 1982 and assigned Ser. No. 367,659, already incorporated by reference.

The video timing and control circuit 20 of FIG. 3 directs the RAM control circuit 24c for each bit plane to read the pixel data out from its corresponding RAM/data logic circuits 24b. The pixel data is read therefrom in parallel fashion and stored in its corresponding shift register 24d. In our example, the pixel data for each pixel in the first two bit planes, associated with the first "surface", and stored in the first two shift registers 24d, is sequentially shifted out therefrom in serial fashion, and located as an index (i.e., an address) to a table stored in the color map memory 26. A brightness index is located in the color map memory 26, corresponding to the binary digits of the pixel data shifted out from the corresponding shift registers 24d, the brightness index determining the brightness of the image displayed on the CRT. The brightness index is converted into an analog voltage via the D-A converter, the analog voltage determining the brightness of the image displayed on the CRT at the particular pixel. Since (in our example) the first two bit planes constitute a "surface", and the last two bit planes also constitute a "surface", there are two "surfaces" in FIG. 4. Therefore, two images may appear on the CRT, independently of one another, or superimposed on one another to produce a composite image.

The composite image displayed on the CRT may, for example, be the picture of the globe shown in FIG. 1a of the drawings.

If, in response to an actuation of the "zoom" key on the keyboard 14, the operator desires to perform the zoom operation, the frame box 10, shown in FIG. 1a will appear on the CRT screen. The processor 16, in response to actuation of the "zoom" key on the keyboard 14, will instruct the vector generator 22 to generate the appropriate binary (pixel) data for storage in the video display memory 24, for further generation of the frame box 10 on the CRT. By operating the thumb wheels on the keyboard 14, the length and width dimensions of the frame box 10 can be altered accordingly. See for example FIG. 1b, wherein the length and width dimension of frame box 10 have been shortened to surround a region more closely oriented with respect to the Great Lakes region of the North American continent. By operating the thumb wheels to shorten the dimensions of the frame box 10, the processor 16, in response thereto, instructs the vector generator 22 to supply the appropriate data to the video display memory 24 for storage therein. This appropriate data stored in the display memory 24 now reflects the shortened frame box 10, along its length and width dimension thereof, shown in FIG. 1b of the drawings.

The binary data stored in the video display memory 24, which reflects the shortened frame box 10, along the length and width dimension thereof, as seen in FIG. 1b, is used as an index to a table stored in the color map memory 26. The table in the color map memory 26 includes a plurality of corresponding brightness indices which determine the brightness of the shortened frame box (10) on the CRT. The brightness index, corresponding to the binary data, is located and is converted to an analog voltage via a D-A converter, the analog voltage determining the brightness of the displayed image on the CRT.

When the operator actuates the "pan" key on the keyboard 14, the length and width dimensions of the frame box 10 are set. A subsequent rotation of the thumb wheels on the keyboard 14 will move the frame box 10 from one location to another on the CRT screen. See, for example, FIG. 1c, wherein the frame box 10 has moved from its location surrounding the Great Lakes region to a location in Northern Canada. Actuation of the "pan" key on the keyboard will also position a cross-hair cursor 10c in the center of the frame box 10. The generation of the frame box 10 shown in FIG. 1c, along with its cross-hair cursor 10c, is accomplished in the same manner as described hereinbefore. The processor, in response to actuations of the "pan" key on the keyboard 14, will instruct the vector generator 22 to generate the appropriate binary (pixel) data for storage in the video display memory 24. The binary data stored in the video display memory 24 is used as an index to a table in the color map memory 26, for further determination of the brightness indices corresponding thereto. As mentioned hereinbefore, the brightness indices determine the brightness of the image displayed on the CRT. The located brightness indices are converted to an analog voltage via a D-A converter, the analog voltage determining the brightness of the image displayed on the CRT.

In response to actuation of the "view" key on the keyboard 14, the image shown in the frame box 10 of FIG. 1c undergoes a zoom operation. The image is magnified by a particular factor, the magnified image being shown in FIG. 1d. Note that the width of the lines shown in FIG. 1d are still only one pixel width, the same width as the width of the lines shown in FIG. 1c.

The host computer, or the keyboard, sends original instructions for temporary storage in memory 18, the original instructions describing the displayed image. When the "view" key on keyboard 14 is actuated, the firmware in processor 16 retrieves the original instructions from memory 18 and manipulates the original instructions in such a way as to accomplish the magnification of the displayed image. After the original instructions are manipulated, the processor 16 instructs the vector generator 22, in response thereto, to develop the appropriate binary data for storage in the video display memory 24, this appropriate binary data stored therein representing the already magnified pixel representation of the displayed image, magnified by virtue of the firmware stored in the processor 16. Consequently, the magnification of the image occurs prior to storage of the binary data in the video display memory 24. This binary data, stored in the video display memory 24, is again used as an index to a table in the color map memory 26 for further determination of their associated brightness indices. These associated brightness indices are converted into an analog voltage via the D-A converter, the analog voltage determining the brightness of the image displayed on the CRT.

Since the firmware, stored in the ROM of processor 16, accomplishes the magnification of the image, in response to the actuation of the "view" key on the keyboard 14, the binary data stored in the video display memory 24 already represents the zoomed image. It is because of this sequence of operation that the video display memory 24, in conjunction with the color map memory 26, is capable of maintaining the width of the lines of the zoomed image, shown in FIG. 1d, at a one pixel width, the same width as the width of the lines appearing in FIGS. 1a-1c of the drawings.

The firmware stored in the ROM of processor 16, in response to actuation of the keys on the keyboard 14, is capable of producing more than one viewport for display on the CRT monitor; actually, the firmware is capable of producing up to 64 viewports for display in the CRT monitor. For example, as shown in FIG. 2, two viewports are illustrated, the first viewport 12 illustrating a library floor plan, the second viewport 12a representing a zoomed image of a portion of the library floor plan shown in the first viewport 12. The processor 16 shown in FIG. 3, using the firmware stored therein, retrieves the original instructions from memory 18, and, in accordance with the instructions from the keyboard, generates the appropriate instructions for establishing one or more viewports and for displaying portions of the displayed image therein. These instructions are directed to the vector generator 22, for further development of the appropriate binary data for storage in the video display memory 24, this appropriate binary data representing the image shown in FIG. 2 of the drawings of the present application inclusive of the first viewport 12 and the second viewport 12a. The same sequence of events reoccurs, at this point, for location of the associated brightness indices in the color map memory 26, the brightness indices being converted to an analog voltage via the D-A converter, the analog voltage being determinative of the brightness of the image displayed on the CRT, inclusive of the first and second viewports 12 and 12a.

Consequently, the processor 16, using its firmware stored in the ROM therein, performs the zoom operation. The processor 16 also generates the multiple viewports, shown in FIG. 2. The processor 16 also performs the zoom operation within each of the additional viewports, for example, the additional viewport 12a shown in FIG. 2. The zoom operation is performed in the processor, via the firmware, prior to generation of its instructions. These instructions are directed to the vector generator 22 for development of the appropriate binary data for further storage in the video display memory 24. It is this sequence of events which permits the video display memory 24, in conjunction with the color map memory 26 and the D-A converter to generate the image on the CRT having a width of each line approximately equal to a one pixel width, regardless of the degree of magnification of the zoomed image.

Referring to FIG. 4, a further functional description of the operation of the video display memory 24 will be provided hereinbelow.

As stated in the above paragraphs, the processor 16 performs the magnification of the image, the zoom operation, using the original instructions, describing the image, stored in memory 18, prior to generation of its instructions directed to the vector generator 22. The vector generator 22 develops the binary data, the pixel data, and stores this binary data in the video display memory 24.

In FIG. 4, the video display memory 24 is represented by the RAM control circuits 24c, their associated RAM/data logic circuits 24b, and their corresponding shift registers 24d. The ALU control circuits 24a, shown in FIG. 4, energize one or more of the bit planes shown in FIG. 4, each bit plane comprising one shift register, one set of 20 RAM/data logic circuits 24b, and one RAM control circuit 24c. As shown in FIG. 4, the first two bit planes are enabled in response to the energization thereof by their corresponding ALU control circuits 24a. The ALU control circuit is energizing each of these bit planes in response to a binary digit "1" present in the surface information index 30. This surface information index, stored in memory 18, is discussed in a pending application entitled "Method and Apparatus for Displaying Images," filed on Apr. 12, 1982 and assigned Ser. No. 367,659, already incorporated by reference hereinabove.

Since the first two bit planes shown in FIG. 4 are enabled, the vector generator 22 develops binary, pixel data for storage in the RAM/data logic circuits 24b for each of these first two bit planes. Since the last two bit planes shown in FIG. 4 are not enabled, binary data will not be stored in these last two bit planes. Once the binary data is stored therein, the video timing and control circuit 20 instructs the RAM control circuit 24c, associated with these first two bit planes, to read the corresponding binary data therefrom, simultaneously, in parallel fashion, for storage in their corresponding shift registers 24d. The shift registers, sequentially, shift the binary data out therefrom in serial fashion, the shifted data being used as an index to a table stored in the color map memory 26. Each piece of binary data shifted out from the shift register 24d, is associated with one pixel on the CRT screen, and corresponds to a brightness index stored in the color map memory 26. The corresponding brightness index, located in the color map memory 26, is converted to an analog voltage via the D-A converter, the analog voltage being determinative of the brightness of the image at the particular pixel on the CRT. A further detailed discussion of the operation of the RAM/data logic circuits 24b is presented in the co-pending application mentioned hereinabove, entitled "Method and Apparatus for Displaying Images", filed on Apr. 12, 1982 and assigned Ser. No. 367,659, already incorporated by reference.

The firmware, stored in the ROM of processor 16, is characterized by the following two sets of algorithms: the first set is the algorithm for providing the zoom operation and for providing the multiple viewports for display on the CRT monitor; the second set includes definitions of the undefined terms in the algorithm of the first set. Appendix A represents the second set, the definitions of the undefined terms present in the first set. Appendix B represents the first set, the algorithm for providing the zoom operation and the multiple viewports.

APPENDIX A 9.3.1 CONTEXT RESERVATION SUBSYSTEM

FUNCTION:

This system keeps the various asynchronous processes in the display system from colliding with each other. It does this through a hierarchy of special monitors which prevent the execution of critical sections of code while another process is relying on the values of selected global variables. There is also a context saving section which will save the current state of these variables when a higher priority process must use them.

DATA AND CONTROL FLOW:

???

DATA REFERENCES:

???

MODULES REFERENCED:

???

DATA DEFINITIONS:

???

PROCEDURES:

| | | |
|---|---|---|
| D12NewAction | D2NWAC | Called to request a new context in the hardware registers |
| D12NoAction | D2NOAC | Called to indicate current hardware register context is invalid |
| D12PushBeamContext | D2PSBM | Saves the state of global variables used by several systems to control the graphics environment |
| D12PopBeamContext | D2PPBM | Restores the graphics context |
| D12PeserveScroll | D2LOCK | Requests ownership of the scroll system |
| D12ReleaseScroll | D2LOCK | Releases ownership of the scroll system |
| D12PeserveDA | D2LOCK | Requests ownership of the dialog area |
| D12ReleaseDA | D2LOCK | Releases ownership of the dialog area |
| D12PeserveDADis | D2LOCK | Requests ownership of both the dialog area and the display system |
| D12ReleaseDISDA | D2LOCK | Releases the ownership of both |
| D12ReserveDisplay | D2LOCK | Requests ownership of the display system |

| | | | |
|---|---|---|---|
| D12ReleaseDisplay | D2LOCK | Releases ownership of the display system |
| D12ReserveHW | D2LOCK | Requests ownership of the display hardware |
| D12ReleaseHW | D2LOCK | Releases ownership of the display hardware |
| D12EnterSemaphore | D2LOCK | Requests ownership of the display hardware in a state where the hardware is ready and no context preserved |

9.3.1.1 D12NewAction (D2NWAC) -

FUNCTION:

This routine is called to insure that specific hardware registers are set up with the context being requested. The specific hardware registers involved are:

- SR1 SR2 -- the 32 shift register used for dash patterns
- GRMode01 GRmode2 -- the ALU operation and enable registers
- ColControl -- specifies single or dual mode index writing
- ColFile -- defines gray index used for writing
- Xaxis Yaxis -- current position of the vector generator In addition, whenever the current action is for vectors, the contents of the shift register are preserved, thereby maintained the phase of dash patterns through sequences of line segments, despite whatever intervening uses the hardware is put to.

CALLING SEQUENCE:

Call D12NewAction(bx:action)

```
action: <0..3>   0 = NoAction (save dash mask)
                 1 = DiaAction (set up for dialog area)
                 2 = VecAction (set up for vectors)
                 3 = GalfAction (set up for graphic alpha)
```

Near call

DATA REFERENCES:

???

MODULES REFERENCED:

D12XYshove

DATA DEFINITIONS:

???

PROCEDURES:

```
Wait for the hardware to be unbusy
If (Action <> LastAction) then
   If (LastAction = VecAction) then
      Save SR1 SR2 in CrntDash1 CrntDash2
   LastAction := Action
   Case LastAction of
      NoAction
      VecAction
         SR1 SR2 := CrntDash1 CrntDash2
         ALU := GRmode01 GRmode2
         ColControl := GRindexMode
         ColFile := GPindex GPbackIndex
```

9.3.1.2 D12NoAction (D2NOAC) -

FUNCTION:

This routine saves the correct phase of the dash mask if the current context in the hardware is for vectors, and sets the current action as undefined, so that whenever any defined action occurs, the hardware will be properly initialized

CALLING SEQUENCE:

Call D12NoAction

No parameters
    Near call

DATA REFERENCES:

???

MODULES REFERENCED:

MonAwaitR
MonSendR

DATA DEFINITIONS:

???

PROCEDURES:

Reserve the display hardware (MonAwaitR)
If (LastAction = VecAction) then
  Wait for the hardware to be ready
  Save SR1 SR2 in CrntDash1 CrntDash2
LastAction := 0 (NoAction)
Release the display hardware (MonSendR)

9.3.1.3 D12PushBeamContext (D2PSBM) -

FUNCTION:

This routine saves the beam context of the current task to allow a higher priority task to execute without regard to restoring the initialization of global variables used by the lower priority task. Because of the nature of the system, the beam context never needs to be saved more than once at a time, and so a static area is used to save just one image, and a counter is used to insure that only the outermost invocation of this routine actually writes over this area.

Both this routine and the corresponding pop routine use a table in ROM which indicates what variables to save and restore. In addition, after saving all the data required, this routine resets several variables to a pristine state.

CALLING SEQUENCE:

Call D12PushBeamContext

No parameters
    Near call

DATA REFERENCES:

???

MODULES REFERENCED:

D12AlphaUpdate
D12Noaction

D12Gezotz?

DATA DEFINITIONS:

???

PROCEDURES:

```
Update the current position in case alpha has occured
    (D12AlphaUpdate)
Save current dash pattern phase (D12NoAction)
Increment ContextCount
If (ContextCount = 0) then (this is the outermost call)
    Save the variables defining beam context
CrntDslBlk := 0 (stop display list construction)
EdgeSave := 0 (stop panel edge collection)
ViewDataPtrH := (disconnect the current panel list)
Reconstruct the alpha mask (D12Gezotz?)
```

9.3.1.4 D12PopBeamContext (D2PPBM) -

FUNCTION:

This routine restores the beam context saved by PushBeamContext.

CALLING SEQUENCE:

Call D12PopBeamContext

No parameters
Near call

DATA REFERENCES:

???

MODULES REFERENCED:

DspSetFillPattern
D12AlphaCharSize
D12NoAction
D12AlphaUpdate
D12Gezotz?

DATA DEFINITIONS:

???

PROCEDURES:

```
Invalidate the contents of the hardware (D12NoAction)
Decrement ContextCount
If (ContextCount < 0) then (we're back out to the outermost call)
    Restore the beam context variables from the save area
Set all the internal fill pattern variables (DspSetFillPattern)
MoveFlag := 0 (to insure clipcodes, etc. start out right)
Reset the alpha character size properly (D12AlphaCharSize)
Update the current position to reflect alpha motion (D12AlphaUpdate)
Rebuild the alpha clipping mask (D12Gezotz?)
```

9.3.1.5 Display System Semaphores (D2LOCK) -

FUNCTION:

The semaphore subsystem controls access to variables global to the entire D12 system and access to the vector generator hardware.

There are four semaphores: Scroll, DA (Dialog Area), Display, and HW (vector generator hardware). The Scroll and DA semaphores controll access to the dialog area; they make sure that the environment assumed by one part of the dialog area implementation is not changed by another task. The Display semaphore protects the environment of the rest of the display subsystem, and the HW semaphore ensures that the state of the vector generator registers is not changed without the knowledge of the current task.

Semaphores must be reserved and released in a strict nesting order. The order is 1.DA, 2.Display, 3.HW when reserving, and the reverse when releasing. If the order is not preserved, the display system will go to sleep forever.

The semaphores for Dialog Area, Scroll buffer and Hardware are all straightforward and identical. Each semaphore is associated with an exchange. The semaphore is incremented, and if it then equals 0, the resource is available and automatically reserved. If it is greater than zero then the caller must wait for the resource to be freed. A call to MonAwaitR is made to wait on the corresponding exchange (DA, Scroll or HW), until the resource has been freed. A corresponding action occurs to release the resource, decrementing then sending a message if necessary.

D12EnterSemaphore is a little trickier. After having reserved the hardware, it additionally waits for the hardware to be ready and also saves the current dash mask phase (through a call to D12NewAction).

Trickiest of all are the routines for the display. The call structure of the display system is such that in order to provide adequate protection, routines which must reserve the display must call routines which also reserve the display. The display must be reserved only once per task, otherwise the system will come to a grinding halt.

In order to assure this, if the calling procedure fails to get the display resource, the task it belongs to checked. If it happens to be the current owner of the display resource, the request is granted, and an internal display depth counter is incremented. If the calling procedure acquires the display resource, either immediately or after waiting on the exchange, its task becomes the new owner and the display depth is reset to 0. A similar process happens to release the display.

DATA AND CONTROL FLOW:

???

```
        Xaxis Yaxis := Xview+XviewCorner Yview+YviewCorner
          (D12XYshove)
    DiaAction
      ALU := DiaMode01 DiaMode2
      ColControl := OverstrikeReplace
      ColFile := LogCharIndex LogBackIndex
      Xaxis Yaxis := AlBeamX AlBeamY (D12XYshove)
    GalfAction
      ALU := GRmode01 GRmode2
      ColControl := GraphicMode
      ColFile := GTindex GRbackIndex
      Xaxis Yaxis := Xview+XviewCorner Yview+YviewCorner-4
        (D12XYshove)
```

DATA REFERENCES:

???

MODULES REFERENCED:

D12NewAction
   MonIsendR

DATA DEFINITIONS:

???

PROCEDURES:
   ???

APPENDIX B 9.2.3.2.6.1 DspRenew (D2RNEW) -

FUNCTION:

This routine is the external interface for renewing one or multiple views.

CALLING SEQUENCE:

Call DspRenew(ViewNumber)

ViewNumber: <integer>  Specifies the view to be renewed.
                                1 - 64 specifies a view of the same number, if it exists
                                0      Renew the current view
                              -1     Renew all views PLM compatible

DATA REFERENCES:

???

MODULES REFERENCED:

D12Page
   DspViewCycle
   D12Rectangler
   DspSelectView
   DspReserveDaDis
   DspReleaseDaDis
   D12reserveDA
   D12releaseDA
   D12WriteDA
   MonErrorLogR2
   DspSuspendFrame
   DspRestoreFrame
   D12EnterSemaphore
   D12releaseHW
   D12UnGezotz

DATA DEFINITIONS:

???

PROCEDURES:

Reserve dialog area and display systems (DspReserveDaDis)
   Suspend all framing operations (DspSuspendFrame)
   Case of viewnumber
      <0
         Reserve display hardware and wait until ready
           (D12enterSemaphore)
         Disable alpha cursor momentarily (D12ungezotz)
         Erase the whole screen (D12rectangler)
         Release the display hardware (D12releaseHW)
         Cycle through each view, redisplaying segments

```
        (DspViewCycle)
    =0
        Redisplay the current view (D12page)
    >0
        If the view number is above 64 then
            Set it to 64
        If the view exists then
            Select that view (DspSelectView)
            Redisplay it (D12page)
            Select the current view (DspSelectView)
        Else
            Log an error (MonErrorLogR2)
Restore any framing operations (DspRestoreFrame)
Release the dialog area and display systems (DspReleaseDaDis)
If the dialog area is visible then
    Initiate a rewrite of the dialog area (D12writeDA)
    Wait until the dialog area is rewritten (D12reserveDA,
        D12releaseDA)
```

9.2.3.2.6.2 D12Page (D2PAGE) -

FUNCTION:

This routine erases the current view and handles other housekeeping associated with redisplay the segments within it.

CALLING SEQUENCE:

Call D12Page

No arguments
    Near call

DATA REFERENCES:

???

MODULES REFERENCED:

D12SetWipeParameters
D12Rectangler
DspRenewView
DspSetBorder
DspSegXY
D12UnGezotz
D12EnterSemaphore
D12releaseHW

DATA DEFINITIONS:

???

PROCEDURES:

Reserve the display hardware and wait until ready
    (D12enterSemaphore)
Disable the alpha cursor for a moment (D12ungezotz)
Set up the wipe parameters for erasing the current view
    (D12setWipeParameters)
Erase the current view (D12rectangler)
Release the display hardware (D12releaseHW)

```
       Flag the view border as down
       Flag the rubberband line as not visible
       Flag vectors as visible
45     Redisplay segments in the current view (DspRenewView)
       Save the vector visibility state
       Flag vectors as visible
       If the border is to be visible then
          Redisplay the border (DspSetBorder)
50     If the standard cursor is visible then
          Redisplay it in its proper position (DspSegXY)
       Restore the vector visibility state
       If fixup level is lower than 2 then
          Turn vector visibility off
55
9.2.3.2.6.3  DspRenewView (D2REVW) -

FUNCTION:

This routine traverses the segment list of the current view,
5    activating the redisplay of each segment in turn.

CALLING SEQUENCE:

CAll DspRenewView
10
          No arguments
          PLM compatible

DATA REFERENCES:
15
       ???

MODULES REFERENCED:

20     DspDisplaySeg
       D12FreeAuxData
       D12pushBeamContext
       D12popBeamContext
       D12SetSegTransform
25
   DATA DEFINITIONS:

???

30
   PROCEDURES:

Save command code for future errors
       If a segment is currently open then
          Throw away its partial panel edge list (D12freeAuxData)
5        Turn off edge saving
       Save the current beam context (D12pushBeamContext)
       Initialize the visible segment list block pointer
       Enable display traversal cancelation
       While there is still a valid visible segment list block do
10        Initialize the visible segment list offset pointer
          While there are still entries in the current block do
             Extract pointers to the segment header and to the
                panel edge list
             If panel lists are to be reconstructed then
15              Throw away the panel edge list (recover memory)
                   (D12freeAuxData)
             Display the current segment in the list (DspDisplaySeg)
             If the panel edge list building was aborted then
                Throw away any remains of the edge list (D12freeAuxData)
20           If a display cancel has been requested then
                Throw away the edge list and mark appropriately
                   in the edge list pointer for this entry
                   (D12freeAuxData)
                Goto 1
25           Else
```

```
            Save the edge list pointer in the current entry
         Advance to the next entry in this block
       Advance to the next block in the list
     If a panel edge list construction was aborted then
       Flag all panel edge list must be reconstructed
     Else
       Flag all panel edge lists as reconstructed
  ;Disable segment traversal cancellation
     Flag blink list reset
     Restore beam context (D12popBeamContext)
     If a segment is currently open then
       Disconnect the display list from display list building
       Flag no segment open
       Redisplay the open segment (DspDisplaySeg)
       Restore display list building
       Flag segment currently open
       Establish the image transform of the open segment
         (D12SetSegTransform)
9.2.4.1  VIEWS SUBSYSTEM -

FUNCTION:

Handles the modification of view parameters and the definition of
   new and current views. This system also handles the operator
   interface to views, including the view keys and the framing system.

DATA AND CONTROL FLOW:

???

DATA REFERENCES:

???

MODULES REFERENCED:

???

DATA DEFINITIONS:

???

PROCEDURES:

This system is itself composed of several subsystems.

VIEW FRAMING       This system provides the user interface for
                      defining the extent of windows and viewports,
                      either explicitly, or through the use of a
                      framing box, which provides a stepwise
                      zoom and pan capability
   VIEWS MAINTENANCE  This system maintains the descriptions of
                      multiple views, and allows the user to
                      peruse through them
9.2.4.1.1  VIEW FRAMING SUBSYSTEM -

FUNCTION:

This system provides the user interface for defining the extent
   of windows and viewports, either explicitly, or through the use of a
   framing box, which provides a stepwise zoom and pan capability.

DATA AND CONTROL FLOW:

???

DATA REFERENCES:

???
```

MODULES REFERENCED:

???

DATA DEFINITIONS:

???

PROCEDURES:

| | | |
|---|---|---|
| DspSetWindow | D2SWIN | External interface for changing the window of the current view. |
| DspSetViewport | D2SVEW | External interface for changing the current viewport. |
| D12WindoViewScale | D2WVSC | Computes the transformation which corresponds to the current window viewport mapping. |
| D12MapWindoView | D2WVMP | Performs a simple 5/32's (640/4096) multiply for converting viewport coordinates. |
| DspView | D2VIEW | Dummy routine for the common VIEW function. |
| DspZoomKey | D2FKEY | Handles the framing key strokes and framing thumbwheel movement by calling the appropriate routines. |
| DspPan | D2PANZ | External interface for entering or leaving PAN mode. |
| DspZoom | D2PANZ | External interface for entering or leaving ZOOM mode. |
| DspFrameView | D2FVW | Redefines the current window to match the frame and renews the viewport. |
| DspSetBorder | D2BORD | Manages display of the viewport border. |
| DspOverView | D2OVER | Adjusts the window for a temporary view of the entire display space. |
| DspNormal | D2NOPM | Adjusts the frame to preserve the aspect ratio of the viewport. |
| DspFrame | D2FUPD | Manages display of the frame. |
| DspSuspendFrame | D2FUPD | Removes the frame temporarily. |
| DspRestoreFrame | D2FUPD | Restores the frame. |
| DspModifyFrame | D2FMOD | Modifies the frame size and position. |
| DspFramePosCheck | D2FPCH | Constrains the position of the framing box to the viewport. |
| DspFrameStack | D2FSTK | Stores the current window and frame definition on the framing stack. |
| DspFrameRestore | D2FRES | Restores the window and frame definition from the framing stack. |
| DspLockViewKeys | D2LKVW | Disables the framing keys. |

9.2.4.1.1.1 DspSetWindow (D2SWIN) -

FUNCTION:

This routine is the external interface for defining the current window for the current view. A pair of coordinates is passed which defines the opposite corners of the window in 4K space. If either the X window size or the Y window size is specified as 0, then it will be calculated so that the window will have the same aspect ratio as the viewport. If both are 0, then the window is set to its default (power up) state.

CALLING SEQUENCE:

Call DspSetWindow(Xmin,Ymin,Xmax,Ymax)

Xmin,Ymin: <0..4095>  Lower left corner of the new window
Xmax,Ymax: <0..4095>  Upper right corner of the new window
                     (Actually, these pairs only need to PLM compatible

DATA REFERENCES:

???

MODULES REFERENCED:

D12WindowViewScale
MonErrorLogR2
D12SetSegTransform
D12MoveDirect
D12ReserveDisplay
D12ReleaseDisplay

DATA DEFINITIONS:

???

PROCEDURES:

???

be opposite corners, since this
routine will swap them if necessary)

9.2.4.1.1.2 DspSetViewport (D2SVEW) -

FUNCTION:

This routine is the external interface for defining the current viewport of the current view. Although the actual limits of the screen are 640 by 480, the viewport is expressed in a normalized device coordinate space of 4095 by 4095.

CALLING SEQUENCE:

Call DspSetViewport(Xmin,Ymin,Xmax,Ymax)

| | | |
|---|---|---|
| Xmin,Xmax: <0..4095> | Minimum and maximum X values for the viewport | |
| Ymin,Ymax: <0..3071> | Minimum and maximum Y values for the viewport (These pairs can be entered as any opposite corners of the viewport) | |

PLM compatible

DATA REFERENCES:

???

MODULES REFERENCED:

D12WindoViewScale
D12MapWindoView
MonErrorLogR2
D12MoveDirect
D12SetSegTransform
D12ReserveDisplay
D12ReleaseDisplay
DspSetBorder

DATA DEFINITIONS:
???

PROCEDURES:
???

9.2.4.1.1.3 D12WindoViewScale (D2WVSC) -

FUNCTION:

This routine is used to compute the window/viewport transformation and to detect overflow of the limits of the transformation. The actual transformation matrix is maintained as a set of 32 bit fixed point numbers, and it is possible to define window/viewport transformations which will not fit in this range. This routine will only update the current window/viewport transformation if it is valid; otherwise, it returns an error.

CALLING SEQUENCE:

Call D12WindoViewScale-> ax:Overflow

Overflow: <0..1>    0 = valid transformation
                           1 = overflow Near call

DATA REFERENCES:

???

MODULES REFERENCED:

D12MultFixFix
D12SetWVtransform

DATA DEFINITIONS:

???

PROCEDURES:

???

9.2.4.1.1.4 D12MapWindoView (D2WVMP) -

FUNCTION:

This routine is used to map coordinates from 4K space to 640 space. It does a quick false multiply using shifts and adds to compute the ratio 5/32.

CALLING SEQUENCE:

Call D12MapWindoView(ax:value)-> ax:result value: <integer>    Value to be transformed
    result: <integer>   Result := Value*5 DIV 32
    Near call

DATA REFERENCES:

???

MODULES REFERENCED:

none

DATA DEFINITIONS:

???

PROCEDURES:

???

9.2.4.1.1.5 DspView -
FUNCTION:

For the common 4110 series terminal, there is a common function which is to be invoked when the shift key is pressed, to bring a DVST out of view-hold. Since this terminal is raster based and has no such function, this routine does nothing, simply returning to its caller.

CALLING SEQUENCE:

Call DspView

No parameters
PLM compatible

DATA REFERENCES:

???

MODULES REFERENCED:

none

DATA DEFINITIONS:

???

PROCEDURES:

Return 9.2.4.1.1.6  DspZoomKey (D2FKEY) -

FUNCTION:

This routine accepts framing key strokes and thumbwheel reports at the KbdZoomOX exchange and transfers control to the appropriate routine.

CALLING SEQUENCE:

Message sent to KbdZoomOX exchange with KeyStroke at byte 10, HorizontalThumb at byte 11 and VerticalThumb at byte 13

| | |
|---|---|
| KeyStroke: <byte> | A key stroke number or a value indicating that a thumbwheel was turned |
| HorizontalThumb: <byte> | Amount of horizontal-thumbwheel movement |
| VerticalThumb: <byte> | Amount of vertical-thumbwheel movement |

Far call

DATA REFERENCES:

???

MODULES REFERENCED:

DspPan
DspZoom
DspFrameView
DspNormal
DspOverView
DspSetBorder
DspModifyFrame
DspFrameRestore
DspSelectView
DspZoomKey
DspReserveDsDis
DspReleaseDisDa
DspSuspendFrame
DspRestoreFrame

```
        MonAwaitR
        MonQDisposR
        KbdLON
  45    KbdLOF
        KbdBel

DATA DEFINITIONS:

50    ???
    PROCEDURES:

Repeat Forever
            MonAwaitR(ax:-1,si:KbdZoomOX)
                {Wait forever at the KbdZoomOX exchange for a message}
   5        KeyStroke = 10th byte of message
            HorizontalThumb = 11th byte of message
            VerticalThumb = 13th byte of message
            MonQDisposR(si:KbdZoomOX)
                {Dispose the Q block message}
  10        KeyStroke = KeyStroke-FF9CH
            If ((The framing keys are locked) or (KeyStroke does not represent
                an Immediate Action Key and we are in Setup)) then
                {The framing keys are locked with the <Lock-Viewing-Keys> command
                (<esc>R). The Immediate Action Keys are: <NEXTVIEW>,<BORDER>,
  15            (<ctrl> <NEXTVIEW>),(<ctrl> <PAN>) and (<ctrl><BORDER>)}
                If KeyStroke does not indicate a thumbwheel movement then
                    Turn the KYBD LOCK light on for .075 seconds
                    Turn the KYBD LOCK light off
                    Sound the bell
  20                {We do not sound this warning for thumbwheel movement
                    because of the constant ringing effect that can occur which
                    is annoying}
            Else    {we execute the keystroke or thumbwheel movement}
                DspReserveDaDis {Reserve the dialog and display semaphores}
  25            If KeyStroke indicates thumbwheel movement then
                    If the <ctrl> key is depressed then
                        KeyStroke = KeyStroke+8
                    DspModifyFrame(bx:KeyStroke)
                Else    {KeyStroke represents an actually key depression}
  30                Case of
                        {Jump thru a table indexed by KeyStroke to the appropriate
                        section of code}
                        <RESTORE> or <ctrl> <RESTORE> key:
                            {Shift <VIEW> or <ctrl> Shift <VIEW>}
  35                        DspFrameRestore(BX:KeyStroke)
                        <OVERVIEW> or <ctrl> <OVERVIEW> key:
                            {Shift <PAN> or <ctrl> Shift <PAN>}
                            DspOverView(bx:KeyStroke)
                        <BORDER> or <ctrl> <BORDER> key:
  40                        {Shift <NEXTVIEW> or <ctrl> Shift <NEXTVIEW>}
                            DspBorder(2)   {To toggle the border}
                                {DspBorder ignores the <ctrl> key}
                        <NORMAL> or <ctrl> <NORMAL> key:
                            {Shift <ZOOM> or <ctrl> Shift <ZOOM>}
  45                        DspNormal(bx:KeyStoke)
                        <OTHERVIEW> operation (<ctrl> <VIEW>):
                            DspSuspendFrame
                            DspSelectView(0)
                            DspFrameView
  50                        DspSelectView(-1)
                            DspRestoreFrame
                            {Take the frame down, select the next higher-numbered
                            view, renew that view using the window defined by the
                            frame in the original view, return to that original
  55
                            view by selecting the next lower-numbered view, and put
                            the original frame back up.}
                        <VIEW> key:
                            DspFrameView
                        <PAN> key:
   5                        DspPan
```

```
<PREVIOUSVIEW> operation (<ctrl> <NEXTVIEW>):
    Save CurrentView
    DspSelectView(-1)   (select next lower-numbered view)
    If new-CurrentView <> Old-CurrentView then
        (There is at least 2 views so we blink the border on
        the new view in XOR mode to avoid wiping out the border
        pixels in the new viewport.)
        BupDown.HighByte = FFH    (set XORflag True)
        DspSetBorder(2)     (toggle border)
        MonAwaitR(10)       (wait 1/4 second)
        DspSetBorder(2)     (toggle border)
        BupDown.HighByte = 0     (set XORflag False)
<NEXTVIEW> key:
    Save CurrentView
    DspSelectView(0)    (select next higher-numbered view)
    If new-CurrentView <> Old-CurrentView then
        (There is at least 2 views so we blink the border on
        the new view in XOR mode to avoid wiping out the border
        pixels in the new viewport.)
        BupDown.HighByte = FFH    (set XORflag True)
        DspSetBorder(2)     (toggle border)
        MonAwaitR(10)       (wait 1/4 second)
        DspSetBorder(2)     (toggle border)
        BupDown.HighByte = 0     (set XORflag False)
<ctrl> <ZOOM> key:
    DspModifyFrame(si:-192,di:-192)
<ZOOM> key:
    DspModifyFrame(si:KeyStroke)
<ctrl> <PAN> key:
    (No action is taken)
         End-Case
    End-Repeat
End
```

9.2.4.1.1.7  DspSetBorder (D2BORD)

FUNCTION:

This routine draws or undraws the border.

CALLING SEQUENCE:

Call DspBorder(ActionCode)

ActionCode: <integer>         0: Turn border off
                              1: Turn border on
                              2: Toggle border Far call

DATA REFERENCES:

???

MODULES REFERENCED:

DspLineIndex
Dsp4014Line
D12MoveDirect
DspDrawDirect
DspSegMode
DspNearCaller
DspReserveDaDis
DspReleaseDisDa
DspSetBorder
DspSelectView
DspSuspendFrame
DspRestoreFrame
DspXORLineEnter
DspXORLineExit
MonErrorLogR2

DATA DEFINITIONS:

???

PROCEDURES:

```
    If (ActionCode < 0 or Action > 2) then
        MonErrorLogR2('RE11'-equivalent)
    Else
        {Note originally BorderOn represented "The desired status of
        border" and BupDown represented "The current actual status of
        border." There is some redundancy in the use of these variables.
        BupDown.HighByte is used as XORflag, a byte flag (0 or FFH)
        indicating whether or not the border is to be written in XOR mode,
        a mode used to blink the border off and on without destroying the
        pixels under the border.}
    If ActionCode = 2 then
        ActionCode = XOR(BorderOn,1H)
            {BorderOn = 0 if the border is not on
             BorderOn = 1 if the border is on
             To toggle, we force Actioncode to be the opposite of
             BorderOn.}
    original-BorderOn = borderOn
    BorderOn = ActionCode
    BupDown.LowByte = ActionCode
        {Set BorderOn and BupDown to the value of the border's presence
        after this routine is executed.}
    BupDown.LowByte = ActionCode
    If ActionCode <> original-BorderOn then
        {The border must be drawn to turn it on or off.}
        If NOT TourViews then
            DspSuspendFrame
                {If TourViews True, then we do not want to blink the border
                because we are traversing all of the viewports and blinking
                all the borders is distracting (besides slowing the
                process)}
        DspXORLineEnter
            {Save the beam context. Also the writing mode is changed to
            XOR}
        Dsp4014Line(60H)  {Request a solid line}
        Save DefSegStatus
            {Save the default writing mode for nonretained segments in
            order to draw the border in the mode that we choose (SET or
            XOR).}
        If BupDown.HighByte = 0 then  {XOFflag False}
            {For XORflag True, the call: DspLineIndex(BorderIndex)
            should be made. This is missing and is a bug.}
            If BupDown = 1 then  {bring border up}
                DrawIndex = BorderIndex
            Else                 {bring the border down}
                DrawIndex = GrBackIndex
                    {we erase the border by drawing with the viewport wipe
                    index}
            DspLineIndex(GrBackIndex)
            DspSegMode(-2,1)
                {Set the default writing mode to SET}
        Move(ax:XWindoCorner,dx:YWindoCorner)
            {Move to lower left corner}
        Draw(ax:XWindoCorner,dx:YWindoCorner+YWindoSize)
            {Draw to upper left corner}
        Draw(ax:XWindoCorner+XWindoSize,dx:YWindoCorner+YWindoSize)
            {Draw to upper right corner}
        Draw(ax:XWindoCorner+XWindoSize,dx:YWindoCorner)
            {Draw to lower right corner}
        Draw(ax:XWindoCorner,dx:YWindoCorner)
            {Draw to lower left corner}
        Restore DefSegStatus
            {Reset the default writing mode}
        DspXORLineExit   {Restore the beam context}
    Exit
```

```
          Local Procedure Move(ax:X,dx:Y)
            Dl2MoveDirect(X,Y)
            Return
15        Local Procedure Draw(ax:X,dx:Y)
            Dl2DrawDirect(X,Y)
            Return
        End
9.2.4.1.1.8  DspPan,DspZoom (D2PANZ) -

FUNCTION:

This DspPan routine executes the PAN key function of entering the
5   PAN  submode  of  Framing  Mode or exiting Framing Mode.  This DspZoom
    routine executes the ZOOM key function of  entering  ZOOM  submode  of
    Framing Mode or exiting Framing Mode.

CALLING SEQUENCE:
10
        Call DspPan
        Call DspZoom

No Parameters
15      Far calls

DATA REFERENCES:

???
20
    MODULES REFERENCED:

DspFrame

25  DATA DEFINITIONS:

???
    PROCEDURES:

DspPan:
          Case of
            DspFmode = 0:
5               {Originally not in framing mode so we enter pan submode}
              FrameInit
              DspFmode = 2    {signify Pan submode}
              DspFrame(nonzero value)   {put frame up}
            DspFmode = 1:
10              {Originally in Zoom submode so we enter pan submode}
              DspFrame(0)    {take frame down}
              DspFmode = 2   {signify Pan submode}
              DspFrame(nonzero value)     {put new frame up}
            DspFmode = 2
15              {Originally in pan submode so we exit framing mode}
              DspFrame(0)      {take frame down}
              DspFmode = 0     {signify not in framing mode}
        DspZoom:
          Case of
20          DspFmode = 0:
               {Originally not in framing mode so we enter Zoom submode}
              FrameInit
              DspFmode = 1     {signify Zoom submode}
              DspFrame(nonzero value)     {put frame up}
25          DspFmode = 1:
               {Originally in Zoom submode so we exit framing mode}
              DspFrame(0)      {take frame down}
              DspFmode = 0     {signify not in framing mode}
            DspFmode = 2:
30             {Originally in pan submode so we enter Zoom submode}
              TakeFrameDown
              DspFmode = 1
              DspFrame(nonzero value)     {put frame up
```

```
    Exit
     FrameInit
       Fwidth = XwindoSize
       FwidthOriginal = XwindoSize
       FXcent = 2*(XwindoCorner+(XwindoSize/2))
           {FXcent has a 1 bit fraction and represents the X center point
            of the frame in units of one-half Tek points}
       Fheight = YwindoSize
       FheightOriginal = YwindoSize
       FYcent = 2*(YwindoCorner+(YwindoSize/2))
           {FYcent has a 1 bit fraction and represents the Y center point
            of the frame in units of one-half Tek points}
    End
  9.2.4.1.1.9 DspModifyFrame (D2FMOD) -

FUNCTION:

This routine modifies the size and/or position of the framing box
    taking into account the limits on its position and size. It also
    renews the frame.

CALLING SEQUENCE:

Call DspModifyFrame(bx:CtrlKeyStroke,si:HorizontalThumb,
                       di:VerticalThumb)

CtrlKeyStroke: <byte>   CtrlKeyStroke < ThumbwheelCtrlValue:
                                <ctrl> key not pressed
                                CtrlKeyStroke >= ThumbwheelCtrlValue:
                                <ctrl> key pressed
        HorizontalThumb: <integer>    Horizontal thumbwheel movement
        VerticalThumb:   <integer>    Vertical thumbwheel movement
        Far call

DATA REFERENCES:

???

MODULES REFERENCED:

DspFrame

DATA DEFINITIONS:

???
    PROCEDURES:

DspSuspendFrame    {bring the frame down}
        If DspFmode = 0 then    (Pan submode)
          HorizontalMovement = (HorizontalThumb*XwindoSize)/3000
              {Note that as the framing box gets wider, it moves faster
               horizontally}
          If HorizontalThumb <> 0 then
            If HorizontalThumb > 0 then
              Increment HorizontalMovement
            Else
              Decrement HorizontalMovement
               {We guarantee at least one Tek point horizontal movement if
                the horizontal thumbwheel is moved}
          FXcent = FXcent+HorizontalMovement
          VerticalMovement = (VerticalThumb*XwindoSize)/3000
              {Note that as the framing box gets taller, it moves faster
               vertically}
          If VerticalMovement <> 0 then
            If VerticalMovement > 0 then
              Increment VerticalMovement
            Else
              Decrement VerticalMovement
               {We guarantee at least one Tek point vertical movement if the
                vertical thumbwheel is moved}
```

```
                FYcent = FYcent+VerticalMovement
             Else                   {Zoom submode}
                HorizontalThumb = Maximum(HorizontalThumb,-256)
                VerticalThumb = Maximum(VerticalThumb,-256)
                If <ctrl> key was not pressed then
                   If HorizontalThumb = 0 then
                      HorizontalThumb = VerticalThumb
                         {If the <ctrl> key was not pressed then we use the
                          horizontal thumbwheel's movement unless only the vertical
                          thumbwheel was moved in which case we use that movement}
                new-Fwidth = (Fwidth*(HorizontalThumb+512))/512
                If HorizontalThumb <> 0 then
                   If HorizontalThumb > 0 then
                      Increment new-Fwidth
                   Else
                      Decrement new-Fwidth
                         {We guarantee that the width of the framing box will increase
                          by at least one Tek point if the horizontal thumbwheel is
                          moved or the vertical thumbwheel was moved and the <ctrl> key
                          was not pressed}
                new-Fheight = (new-Fwidth*FheightOriginal)/FwidthOriginal
                   {We adjust the height so that the aspect ratio
                    (new-Fheight/new-Fwidth) = (FheightOriginal/FwidthOriginal)}
                If <ctrl> key was pressed then
                   new-Fheight = (Fheight*(VerticalThumb+512))/512
                   If VerticalThumb <> 0 then
                      If VerticalThumb > 0 then
                         Increment new-Fheight
                      Else
                         Decrement new-Fheight
                            {We guarantee that the height of the framing box will
                             increase by at least one Tek point if the <ctrl> key was
                             pressed and the vertical thumbwheel was moved}
                FrameSizeCheck(ax:XwindoSize,si:new-Fwidth,di:new-Fheight)->
                     si:(adjusted)new-Fwidth , di:new-Fheight
                FrameSizeCheck(ax:YwindoSize,si:new-Fheight,
                     di:(adjusted)new-Fwidth)-> si:(adjusted)new-Fheight,
                     di:(adjusted)new-Fwidth
                         {The framing box's width and height are adjusted so that they
                          are not too large. We now drop the prefix "adjusted"}
                If (new-Fwidth <= Fwidth or new-Fheight <= Fheight) then
                         {If the frame has shrunk then we test for minimum size limits}
                   If (Fwidth >= XwindoSize/16 and Fheight >= YwindoSize/16 and
                        Fwidth >= 8 and Fheight >= 8) then
                      If (XviewSize/Fwidth <= 8 and YviewSize/Fheight <=8) then
                            {This restriction is imposed by limits on the elements of
                             the window-viewport transformation matrix}
                         Fwidth = new-Fwidth
                         Fheight = new-Fheight
                         If <ctrl> key was pressed then
                            FwidthOriginal = Fwidth
                            FheightOrigianl = Fheight
                               {We reset the "original" definitions so that the new
                                aspect ratio will be preserved}
                         DspFramePosCheck
                            {Given that the size of the framing box is adjusted, the
                             routine DspFramePosCheck will move it as necessary to
                             stay within the 4K by 4K space and to require at least
                             1/8 of the framing box to be in the viewport}
                         DspRestoreFrame   {bring the frame up}
             Exit
             FrameSizeCheck(ax:OriginalSize1,si:Size1,di:Size2)->
             si:(adjusted)Size1
                SizeLimit = Minimum(4*OriginalSize1,4095)
                (adjusted)Size1 = Size1
                If Size1 > SizeLimit then
                   (adjusted)Size1 = SizeLimit
                   If <ctrl> key was not pressed then
                      Size2 = (Size2*((adjusted)Size1/Size1)
```

(preserve the aspect ratio)
End
9.2.4.1.1.10 DspFrameStack (D2FSTK) -

FUNCTION:

This routine pushes the current window and frame definition (11 words) on a stack-like data structure with 4 entires. The first entry contains the "original" window and frame definition which can be retrieved by pressing <ctrl> RESTORE. The other 3 entries form a stack.

CALLING SEQUENCE:

Call DspFrameStack

No Parameters
Far call

DATA REFERENCES:

???

MODULES REFERENCED:

DATA DEFINITIONS:

???
PROCEDURES:

Increment Fcurrent
If Fcurrent > 4 then
    (If we store a frame into a full stack then we first push down
    the top 3 items on the stack and leave the first item
    representing the "original" window-and-frame-definitioin alone)
    Move item 2 onto item 1
    Move item 3 onto item 2
    Decrement Fcurrent
FNStacked = Fcurrent
    (set the top of stack)
Store the following 11 words in order into the Fcurrent place in the
    Fstack array: XwindoCorner,YwindoCorner,XwindoSize,YwindoSize,
    DspFmode,FXcent,FYcent,Fwidth,Fheight,FwidthOriginal and
    FheightOriginal
End
9.2.4.1.1.11 DspFramePosCheck (D2FPCH) -

FUNCTION:

This routine modifies the position of the framing box if necessary in order to keep it within the 4K by 4K space and to allow no more than 7/8 of the framing box to be outside of the viewport.

CALLING SEQUENCE:

Call DspFramePosCheck

No Parameters
Far call

DATA REFERENCES:

???

MODULES REFERENCED:

DATA DEFINITIONS:

???

PROCEDURES:

```
      LowerLimitX = 2 * (Maximum(XwindoCorner-(7/8)*Fwidth),0)
           {1 bit of fraction is provided by shifting left one place}
      UpperLimitX = 2 * (Minimum(XwindoCorner+(7/8)*Fwidth),4095)
      LowerX = FXcent-Fwidth      {1 bit of fraction}
      DifX = LowerX-LowerLimitX
      If DifX < 0 then
        FXcent = FXcent-DifX
           {If the framing box is too far to the left, then we move it to
            the right by the excess distance (with 1 bit of fraction)}
      UpperX = FXcent+DifX       {1 bit of fraction}
      DifX = UpperX-UpperLimitX
      If DifX > 0 then
        FXcent = FXcent-DifX
           {If the framing box is too far to the right, then we move it to
            the left by the excess distance (with 1 bit of fraction)}
      LowerLimitY = 2 * (Maximum(YwindoCorner-(7/8)*Fheight),0)
           {1 bit of fraction is provided by shifting left one place}
      UpperLimitY = 2 * (Minimum(YwindoCorner+(7/8)*Fheight),4095)
      LowerY = FYcent-Fheight     {1 bit of fraction}
      DifY = LowerY-LowerLimitY
      If DifY < 0 then
        FYcent = FYcent-DifY
           {If the framing box is too far to down, then we move it up
            by the excess distance (with 1 bit of fraction)}
      UpperY = FYcent+DifY       {1 bit of fraction}
      DifY = UpperY-UpperLimitY
      If DifY > 0 then
        FYcent = FYcent-DifY
           {If the framing box is too far up, then we move it down
            by the excess distance (with 1 bit of fraction)}
    End
```

9.2.4.1.1.12 DspFrameRestore (D2FUPD) -

FUNCTION:

This routine retrieves from the frame stack a previous window-and-frame-definiton.

CALLING SEQUENCE:

Call DspFrameRestore(bx:CtrlKeyStroke)

```
    CtrlKeyStroke: <byte>   CtrlKeyStroke < ThumbwheelCtrlValue:
                            <ctrl> key not pressed
                            CtrlKeyStroke >= ThumbwheelCtrlValue:
                            <ctrl> key pressed
```

Far call

DATA REFERENCES:

???

MODULES REFERENCED:

DspFrame
DspSetWindow
DspRenew
DspReserveDaDis
DspReleaseDisDa

DATA DEFINITIONS:

???

PROCEDURES:

```
    If FNStacked <> 0 then
      {If FNStacked = 0 then no window-and-frame-definitions have been
```

```
    stored so we merely exit)
If <ctrl> key pressed then
  Fcurrent = 1
original-Fcurrent = Fcurrent
Fcurrent = Fcurrent-1
If Fcurrent = 0 then
  Fcurrent = FNStacked
ImplicitCallFlag = 1
    (This prevents the re-definition of the "original" window)
DspFrame(0)        (take frame down)
Restore the first 4 values from the original-Fcurrent window-and-
frame-definition in Fstack
    (Restore XwindoCorner,YwindoCorner,XwindoSize,YwindoSize)
DspSetWindow(XwindoCorner,YwindoCorner,XwindoCorner+XwindoSize,
    YwindoCorner+YwindoSize)
    (Reset the window-viewport scale factors)
Restore the last 7 values from the original-Fcurrent window-and-
frame-definition in Fstack
    (Restore DspFmode,FXcent,FYcent,Fwidth,Fheight,FwidthOriginal,
    FheightOriginal)
DspFrame(nonzero)    (put up frame)
DspReleaseDisDa
DspRenew              (Renew only outside semaphores)
DspReserveDaDis
End
```

9.2.4.1.1.13 DspLockViewKeys (D2LKVW) -

FUNCTION:

This routine prevents or allows the use of the framing keys and the thumbwheels for framing box manipulation.

CALLING SEQUENCE:

Call DspLockViewKeys(Lock)

Lock: <integer>    1: Lock the framing keys
                                  0: Unlock the framing keys Far call

DATA REFERENCES:

???

MODULES REFERENCED:

DspFrame
MonErrorLogR2
DspReserveDaDis
DspReleaseDisDa

DATA DEFINITIONS:

???

PROCEDURES:

```
If (Lock < 0 or Lock > 1) then
  MonErrorLogR2(ax:'RJ11'-equivalent)
Else
  If Lock = 0 then    (unlock the framing keys)
    LockKeys = 0      (signal the unlocked state)
  Else                (lock the framing keys)
    DspReserveDaDis   (get Dialog and display semaphores)
    DspFrame(0)       (bring down frame)
    LockKeys = 3      (signal the locked state)
    DspFmode = 0      (exit framing mode)
    DspReleaseDis     (release semaphores)
End
```

9.2.4.1.2 VIEW MAINTENANCE SUBSYSTEM -

FUNCTION:

This system maintains the descriptions of multiple views, allowing the user to create new views and peruse through them.

DATA AND CONTROL FLOW:

???

DATA REFERENCES:

???

MODULES REFERENCED:

???

DATA DEFINITIONS:

???

PROCEDURES:

| | | |
|---|---|---|
| DspViewAttributes | D2VWAT | Defines the viewport's surface, wipe index and border index. |
| DspSelectView | D2SELV | Selects a view and if it is new then it is initialized with the previous viewport's attributes (surface number, location and size, viewport wipe index, and border index). |
| DspSaveView | D2SAVV | Saves the current view context in a block of memory. |
| DspRestoreView | D2RESV | Restores the current view context from a block of memory. |
| DspViewCycle | D2VWCY | Used to invoke a routine in each of the defined viewports ending with the current one. |
| DspDeleteView | D2DELV | External interface for deleting one view or all views. |
| DspDeleteView1 | D2DEL1 | Deletes a specific view. |
| D12FreePanelLists | D2FRPL | Frees all the panel lists associated with the current view. |

9.2.4.1.2.1 DspSelectView (D2SELV) -

FUNCTION:

This routine selects a view.

CALLING SEQUENCE:

Call DspSelectView(ViewNumber)

ViewNumber: <integer>  The number of the view to select
Far call

DATA REFERENCES:

???

MODULES REFERENCED:

DspRestoreView
DspSaveView
DspFrame
D12EnterSemaphore
D12ExitSemaphore
D12UnGezotz

```
            DspNearCaller
            MonErrorLogR2
            GinResume
            GinSuspend
            GinViewEnd
            GinViewBegin
            DspGinsegXY
            D12FreePanelLists

DATA DEFINITIONS:

???

PROCEDURES:

If (ViewNumber < -1 or ViewNumber > 64) then
            MonErrorLogR2(ax:'RC'-equivalent)
        Else
        If ViewNumber <> CurrentView then
            {We do nothing if we select the current view}
            If ViewNumber = -1 or 0 then
                    {Select the next lower numbered view (-1) or next higher
                    numbered View (0)}
              Direction = ViewNumber
              ViewNumber = CurrentView
              For I = 1 to 64 do
                If Direction = -1 then     {cycle backwards thru the views}
                    Decrement ViewNumber
                    If ViewNumber = 0 then
                        ViewNumber = 64
                Else                       {cycle forwards thru the views}
                    Increment ViewNumber
                    If ViewNumber = 65 then
                        ViewNumber = 1
                If Views[ViewNumber] <> 0 then
                    Go To ViewFound
              End-For
                    {The current view is not stored so that Views[CurrentView]
                    = 0. If no view is stored then we will exhaust the For-Loop
                    and end up with the current view.}
              If DeleteFlag = 0 then
                    {If DeleteFlag is not set then we exit since we are in the
                    only view that exists}
                  Go To Exit
              Else
                    {If DeleteFlag is set then all views have been deleted,
                    in which case we restore the default view on surface one
                    after incrementing the surface one usage count}
                  CurrentView = 1
                  SurfaceUsageTab[1] = 1
                  Go To CallRestore
        ViewFound:
            If ViewNumber <> CurrentView then
                D12EnterSemaphore     {Get hardware semaphore}
                D12Ungezotz           {So we can remove the cursor}
                D12ExitSemaphore      {And release the semaphore}
                If NOT TourViews then
                    DspFrame(0)       {take frame down in this view}
                        {If TourViews True, then we have already brought the frame
                        down before touring the views}
                If InSetUp then       {If in setup mode}
                    GinResume
                GinViewEnd
                D12FreePanelLists
                DspSaveView(CurrentView) -> MemoryError
                If NOT MemoryError then
                    CurrentView = ViewNumber
        CallRestore:
```

```
            DspRestoreView(ViewNumber)
            GinViewBegin
            If InSetUp then      (If in setup mode)
               GinSuspend
            Else
               DspGinSegXY
         Exit:
         End
```

9.2.4.1.2.2  DspSaveView (D2SAVV) -

FUNCTION:

This routine saves the current view context in a block of memory obtained for that purpose.

CALLING SEQUENCE:

Call DspSaveView(ViewNumber)

ViewNumber: <integer>   Number of view context to save
    Far call

DATA REFERENCES:

???

MODULES REFERENCED:

D12AlphaUpdate
DspNearCaller
MonGetMemR
MonErrorLogR3

DATA DEFINITIONS:

???

PROCEDURES:

```
      MonGetMemR(ax:ViewParagraphs)-> MemoryPtrH , MemoryError
         (ViewParagraphs is the number of paragraphs needed to store
          the view context)
      If MemoryError then
         If DeleteFlag then
            (We were called as a result of a Delete-View command)
            MonErrorLogR3('RK11'-equivalent)
         Else
            MonErrorLogR3('RC11'-equivalent)
      Else
         Views[ViewNumber] = MemoryPtrH
         Store ViewWords words from the global parameters starting at
            ViewContext into the memory pointed to by MemoryPtrH
         ViewSglBlk = 0
         ViewSglEndBlk = 0
            (Detach the visible list)
      End
```

9.2.4.1.2.3  DspRestoreView (D2RESV) -

FUNCTION:

This routine restores the current view context from a block of memory obtained pointed to by Views[ViewNumber].

CALLING SEQUENCE:

Call DspRestoreView(ViewNumber)

ViewNumber: <integer>   Number of view context to restore
    Far call

DATA REFERENCES:

???

MODULES REFERENCED:

DspFrame
DspViewAttributes
MonFreeMemR
DspSetWindow

DATA DEFINITIONS:

???

PROCEDURES:

```
If Views[ViewNumber] = 0 then
    Increment SurfaceUsageTab[VptSurfaceNumber]
        {If there is no view saved, then we are adding a new viewport
        on the same surface as the original viewport, wo we increment
        the usage count for lthe surface that the viewport is on.}
Else
    Move ViewWords from the memory pointed to by Views[ViewNumber] to
        the global variables located at ViewContext and above
    MonFreeMemR(bx:Views[ViewNumber],ViewParagraphs)
    Views[ViewNumber] = 0
        {Free that block of memory and zero the pointer to that memory
        in the Views array}
    ImplicitCallFlag = True
    DspSetWindow(XwindoCorner,YwindoCorner,XwindoCorner+XwindoSize,
        YwindoCorner+YwindoSize)
        {Reset the window-viewport scale factors with ImplicitCallFlag
        True to prevent the "original"-window definition in the frame
        stack to be rewritten}
    DspViewAttributes(VptSurfaceNumber,GrBackIndex,BorderIndex)
        {Reset the global parameters depending on the viewport
        attributes}
    If (NOT TourViews and DspFmode > 0) then
        DspFrame(nonzero)
            {If we are touring the views, then the frame is not to be
            put up. Otherwise, if the frame originally was up then we
            redraw it.}
End
```

9.2.4.1.2.4  DspDeleteView (D2DELV) -

FUNCTION:

This routine deletes the specified view, the current view or all views.

CALLING SEQUENCE:

Call DspDeleteView(ViewNumber)

ViewNumber: <integer>  Number of view to delete
Far call

DATA REFERENCES:

???

MODULES REFERENCED:

DspReserveDaDis
DspViewCycle
DspDeleteView1

```
        MonErrorLogR2
        DspSuspendFrame
        DspRestoreFrame
        DspReleaseDisDa

DATA DEFINITIONS:

???
    PROCEDURES:

DspReserveDaDis
            {Reserve the Dialog and Display semaphores}
        DeleteFlag = True
            {This flag is used to determine an error message in
            DspSaveView}
        If ViewNumber = 0 then
            ViewNumber = CurrentView
        If ViewNumber <> CurrentView then
            If ViewNumber < -1 then
                MonErrorLogR2(ax:'RK11'-equivalent)
            Else
                If ViewNumber = -1 then    {Delete all views}
                    DspSuspendFrame   {suspend the frame}
                    For I = 1 to 64 do
                        If ((I = CurrentView) or (I <> CurrentView and Views[I] <> 0)
                            then
                            DspDelete1(si:I)
                                {Views[CurrentView] = 0 since the current view is not
                                saved until a new view is selected, in which case the
                                original current view is no longer current}
                    End-For
                    Go To ExitRestore
                Else      {Delete a specific view which is not the current one}
                    If ViewNumber > 64 then
                        MonErrorLogR2(ax:'RK11'-equivalent)
                    Else
                        If Views[ViewNumber] = 0 then   {view does not exist}
                            MonErrorLogR2(ax:'RK10'-equivalent)
                        Else
                            DspDeleteView1(si:ViewNumber)
            Else    {Delete the current view}
                DspSuspendFrame   {Suspend the frame}
                DspDeleteView1(si:ViewNumber)
        ExitRestore:
            DspRestoreFrame   {Restore the frame in another viewport}
            DspReleaseDisDa
                {Release the display and dialog semaphores}
            DeleteFlag = False
        End
9.2.4.1.2.5  DspDeleteView1 (D2DEL1) -

FUNCTION:

This routine deletes the specified view and frees memory.

CALLING SEQUENCE:

Call DspDeleteView1(si:ViewNumber)

ViewNumber: <integer>  Number of view to delete
            Far call

DATA REFERENCES:

???

MODULES REFERENCED:

DspSelectView
        DspSegVis
```

MonFreeMemR

DATA DEFINITIONS:

???

PROCEDURES:

```
Save Fixup
Fixup = 0
   (We set Fixup to 0 to prevent the undrawing of segments in the
    view that is to be deleted when we make all segments invisible.
    We need to make them invisible in order to throw away the segment
    visibility list associated with the viewport.)
old-ViewNumber = CurrentView
   (We need to know which view to return to)
If ViewNumber = CurrentView then
   ViewNumber = 0
TourViews = True
   (The border and framing box will be untouched by stating that
    we are touring the views)
DspSelectView(ViewNumber)     (enter the view to be deleted)
DspSegVis(-1,0)               (throw away the segment visibility list)
Decrement SurfaceUsageTab[VptSurfaceNumber]
   (Indicate that one less viewport is on the surface)
If ViewSglBlk <> 0 then
   MonFreeMemR(ax:ViewSglChunkSize,bx:ViewSglBlk)
   ViewSglBlk = 0
      (Throw away the segment visibility list header)
DspSelectView(old-ViewNumber)   (return to former view)
MonFreeMemR(ViewParagraphs,bx:Views[ViewNumber])
Views[ViewNumber] = 0
   (Throw away the view's saved context)
Restore Fixup
TourViews = False
End
```

9.2.4.1.2.6  DspViewCycle (D2VWCY) -

FUNCTION:

This routine will cycle through all views calling any given routine (near or far) with any set of parameters. The last view traversed is the original view.

CALLING SEQUENCE:

Call DspViewCycle(Par1,...,ParN,RoutineAddress,N,NearFar)

Par1: <integer>        1st parameter to pass when calling
                               the routine in each view
    • • • • • • •
    ParN: <integer>        Nth parameter to pass when calling
                               the routine in each view
    RoutineAddress: <near address> or <far address>
                               The address of the routine to be
                               called in each view
    N: <integer>           The number of parameters to pass
                               when calling the routine in each view
    NearFar: <integer>     Flag to indicate whether the called
                               routine is near or far
    Far call

DATA REFERENCES:

???

MODULES REFERENCED:

DspSelectView

DATA DEFINITIONS:

???

```
PROCEDURES:

oldCurrentView = CurrentView
         TourViews = True
5           {Indicate that we are touring the views}
         Repeat
            DspSelectView(0)       {Select next view}
            Copy the N parameters from the stack onto the bottom of the stack
            If NearFar = 0 then    {Near routine}
10             Make a near call to RoutineAddress with the N parameters given
            Else          {Far routine}
               Make a far call to RoutineAddress with the N parameters given
         Until CurrentView = oldCurrentView
         TourViews = False
15    End
   9.2.4.1.2.7  D12FreePanelLists (D2FRPL) -

FUNCTION:

5        This routine cycles through all the entries in the visible
      segment list, checking each one for a non-nil panel list pointer, and
      freeing any memory used for holding panel lists.

CALLING SEQUENCE:
10
         Call D12FreePanelLists

DATA REFERENCES:

15       ???

MODULES REFERENCED:

D12FreeAuxData
20
      DATA DEFINITIONS:

???

25    PROCEDURES:

For each block in the visible segment list do
            For each entry in the current block do
               ViewDataPtrH := the panel list pointer for the current entry
30             Discard any allocated memory (D12FreeAuxData)
```

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

I claim as my invention:

1. A graphics display terminal capable of performing a zoom operation on a displayed image to produce a resultant zoomed image, said terminal being responsive to instructions from a main memory source for producing said resultant zoomed image, an improvement comprising:
   input means for introducing information into said graphics display terminal related to said zoom operation;
   first means for processing said instructions from said main memory source and said information introduced via said input means including: a means for designating a portion of the displayed image that is to be subjected to the zoom operation in response to said information, and a means for implementing the zoom operation on the designated portion to produce a representation of a resultant zoomed image with the lines which define the resultant zoomed image being approximately equal to the width of the lines which define said displayed image;
   second means responsive to the representation of the resultant zoomed image for producing a pixel representation of said resultant zoomed image;
   converting means responsive to said pixel representation produced by the second means for converting said pixel representation into video signals representative of said resultant zoomed image; and
   display means responsive to said video signals for displaying said resultant zoomed image.

2. A graphics display terminal in accordance with claim 1 wherein: the first means further includes means for producing output signals representative of the resultant zoomed image; and
   wherein the second means comprises,
   vector generator means responsive to said output signals for generating binary information associated with each pixel of said resultant zoomed image, said binary information being indicative of a display or a non-display at each pixel of said resultant zoomed image; and memory means for storing said binary information associated with each pixel of said resultant zoomed image.

3. A graphics display terminal in accordance with claim 2 wherein said converting means comprises:
correlation means responsive to said binary information stored in said memory means for correlating a brightness index with each said binary information for each pixel of said resultant zoomed image, said brightness index being determinative of the brightness of the displayed image at the corresponding pixel point; and
converter means responsive to the brightness indices associated with each said binary information for converting said brightness indices into said video signals representative of said resultant zoomed image.

4. A graphics display terminal in accordance with claim 1 wherein: said first means further includes means for implementing a plurality of viewports with said displayed image and said resultant zoomed image being disposed within a respective number of said plurality of viewports; and said second means further producing a pixel representation of said plurality of viewports including said displayed image and said resultant zoomed image disposed therein.

* * * * *